United States Patent
Kim et al.

(10) Patent No.: US 8,204,011 B2
(45) Date of Patent: Jun. 19, 2012

(54) METHOD AND APPARATUS FOR TRANSMITTING AND RECEIVING PACKET DATA BETWEEN A NODE B AND A UE USING HARQ IN A MOBILE COMMUNICATION SYSTEM

(75) Inventors: Soeng-Hun Kim, Suwon-si (KR); Youn-Hyoung Heo, Suwon-si (KR); Kyeong-In Jeong, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 1083 days.

(21) Appl. No.: 12/114,247

(22) Filed: May 2, 2008

(65) Prior Publication Data
US 2008/0304447 A1    Dec. 11, 2008

(30) Foreign Application Priority Data
May 2, 2007    (KR) .......................... 10-2007-0042607

(51) Int. Cl.
*H04W 4/00* (2009.01)
*H04L 12/28* (2006.01)
*H04B 1/44* (2006.01)
(52) U.S. Cl. ......... 370/329; 370/328; 370/394; 370/282
(58) Field of Classification Search ................... 370/329
See application file for complete search history.

(56) References Cited

U.S. PATENT DOCUMENTS

| | | | | |
|---|---|---|---|---|
| 5,526,399 | A * | 6/1996 | Kameda | 455/74.1 |
| 6,671,849 | B2 | 12/2003 | Tripathi et al. | |
| 7,047,473 | B2 | 5/2006 | Hwang et al. | |
| 7,209,483 | B2 | 4/2007 | Tran et al. | |
| 8,060,023 | B2 * | 11/2011 | Usuda et al. | 455/69 |
| 2003/0214935 | A1 | 11/2003 | Khan et al. | |
| 2004/0037224 | A1 * | 2/2004 | Choi et al. | 370/235 |
| 2004/0196801 | A1 * | 10/2004 | Hiramatsu | 370/328 |
| 2005/0018610 | A1 * | 1/2005 | Kim et al. | 370/236 |
| 2006/0041815 | A1 * | 2/2006 | Haymond | 714/748 |

(Continued)

FOREIGN PATENT DOCUMENTS

EP    1686716 A1 *    8/2006

(Continued)

OTHER PUBLICATIONS

Adaptive Radio Parameter Control Considering QoS for Forward Link OFCDM Wireless Access, Author: Atsushi Harada, Sadayuki Abeta, and Mamoru Sawahashi, Published: Aug. 2002 http://ieeexplore.ieee.org/xpls/abs_all.jsp?arnumber=1002799.*

(Continued)

*Primary Examiner* — Jeffrey Pwu
*Assistant Examiner* — Noel Beharry
(74) *Attorney, Agent, or Firm* — The Farrell Law Firm, P.C.

(57) ABSTRACT

A method and apparatus for transmitting and receiving packet data between a UE and an Enhanced Node B (ENB) using a Hybrid Auto Repeat Request (HARQ) scheme in a mobile communication system. The method includes the steps of receiving configuration information from an ENB, the configuration information including a first Maximum Retransmission Limit (MRL) value to be applied to data that is transmitted over a persistent resource, and when data to be transmitted by the UE is quasi-real time data, transmitting a first data packet to the ENB by using the persistent resource and applying the first MRL value the first data packet, which is configured from the quasi-real time data.

40 Claims, 13 Drawing Sheets

U.S. PATENT DOCUMENTS

2007/0259665 A1\* 11/2007 Chiu et al. .................. 455/436
2008/0063116 A1\* 3/2008 Yokoyama .................. 375/299

FOREIGN PATENT DOCUMENTS

| EP | 1686743 A1 \* | 8/2006 |
| EP | 1701465 A2 \* | 9/2006 |
| KR | 1020050013038 | 2/2005 |

OTHER PUBLICATIONS

Cross-Layer BackPressure to Improve HSDPA Performance, Author: Lajos Bajzik et. al, Published: 2006 http://ieeexplore.ieee.org/stamp/stamp.jsp?tp=&arnumber=4022309&userType=inst.\*

Moving towards HSUPA, Author: Gaurav Sharma & Kumar G S, Published:2005 http://ieeexplore.ieee.org/stamp/stamp.jsp?tp=&arnumber=1431326&userType=&tag=1.\*

Uplink Capacity of VoIp. On HSUPA, Author: Tao Chen, Markku Kuusela, Esa Malkamaki, Published: 2006 http://ieeexplore.ieee.org/stamp/stamp.jsp?tp=&arnumber=1682855&userType=inst.\*

DPCCH Gating Gain for Voice over IP on HSUPA, Author: Oscar Fresan, Tao Chen, Esa Malamaki, Tapani Ristaniemi, Published: 2007 http://ieeexplore.ieee.org/stamp/stamp.jsp?tp=&arnumber=4225025&userType=inst.\*

Performance of Scheduling Algorithms for HSDPA, Author: Matthias Malkowski, Andreas Kemper, Xiaohua Wang, Published: 2007 http://ieeexplore.ieee.org/stamp/stamp.jsp?tp=&arnumber=4469566&userType=inst.\*

Protocol Interference Between Up and Downlink Channels in HSDPA, Author: Marc C. Necker, Andreas Weber, Published: 2006 http://ieeexplore.ieee.org/stamp/stamp.jsp?tp=&arnumber=4022316&userType=inst.\*

Scheduling performance of Multimedia Services over HSDPA, Author: Frank Brouwer, Irene de Bruin, Neil Whillans, Yusun Fu, Youqian Xiao, Published: 2007 http://ieeexplore.ieee.org/stamp/stamp.jsp?tp=&arnumber=4299143&userType=inst.\*

\* cited by examiner

METHOD AND APPARATUS FOR TRANSMITTING AND RECEIVING PACKET DATA BETWEEN A NODE B AND A UE USING HARQ IN A MOBILE COMMUNICATION SYSTEM

PRIORITY

This application claims priority to an application entitled "Method and Apparatus for Transmitting/Receiving Packet Data between Node B and UE Using HARQ in Mobile Communication System" filed in the Korean Industrial Property Office on May 2, 2007 and assigned Serial No. 2007-0042607, the contents of which are hereby incorporated by reference.

BACKGROUND OF THE INVENTION

1. Field of the Invention

The present invention relates generally to a method and apparatus for data transmission in a mobile communication system, and more particularly to a method and apparatus for transmitting and receiving packet data between a UE and a Node B using a Hybrid Auto Repeat Request (HARQ) in a mobile communication system utilizing an Orthogonal Frequency Division Multiple Access (OFDMA) scheme.

2. Description of the Related Art

For next generation mobile communication systems requiring a high data transfer rate, research is currently being conducted to provide various quality services to users. In order to provide wireless multimedia services of high speed and high quality, broadband spectrum resources are needed. However, by using the broadband spectrum resources, severe fading on the transmission path is caused by multi-path propagation, and frequency selective fading occurs within the transmission band. Therefore, a communication system using multi-carriers robust to frequency selective fading (hereinafter, referred to as a "multi-carrier communication system") is widely used for high speed wireless multimedia services. The multi-carrier communication system is a communication system that utilizes a modulation scheme using multiple sub-carriers. A typical example of such a modulation scheme is an Orthogonal Frequency Division Multiplexing (OFDM) scheme.

The OFDMA scheme corresponds to a multiple access scheme based on the OFDM scheme. In the OFDMA scheme, a portion of all sub-carriers is reconfigured into a sub-channel, which is in turn allocated to a specific user terminal. The sub-channel is a channel including at least one sub-carrier. By using the OFDMA scheme, it is possible to perform dynamic resource allocation through which a sub-channel can be dynamically allocated to a specific user terminal according to the fading characteristic of a wireless channel.

Further, in the OFDMA scheme, a multi-user diversity gain increases with as the number of subscriber terminals increases, i.e., with an increase in the number of users, and thus, active research on the OFDMA scheme is particularly aimed at the next generation communication systems requiring a relatively high transfer rate.

In order to efficiently allocate each sub-channel to a multi-user, the OFDMA communication system also uses a scheme for temporally dividing the sub-channel. When temporally dividing the sub-channel, each divided time unit is called a Transmission Time Interval (TTI).

Hereinafter, a Long Term Evolution (LTE) system, which is one of the next generation mobile communication systems using the OFDM, will be described by way of example. The 3GPP ($3^{rd}$ Generation Partnership Project) is now discussing the LTE system as a next generation UMTS (Universal Mobile Telecommunication Service) system. The LTE system, which is hoped to be commercialized by 2010, enables a bandwidth, which has been limited to 5 MHz in the existing $3^{rd}$ generation mobile communication, to vary from 1.25 MHz to 20 MHz, and is currently under standardization for implementing a data transfer rate of about 100 Mbps.

FIG. 1 illustrates a communication network structure of a conventional LTE system. In the LTE system, User Equipments UE #1 141, UE #2 143, and UE #3 145 are connected with a core network 110 through an Enhanced Node B (ENB) 133 and an access gateway 120. A UE is also commonly referred to as a mobile station (MS), a terminal equipment (TE), or the like, but is expressed by "UE" in FIG. 1 because such an expression is customary. Further, although three UEs are illustrated in FIG. 1, it is obvious that the number of UEs may vary according to communication environments.

FIG. 2 illustrates a conceptual view for explaining a transmission resource block in the LTE system. In FIG. 2, it is assumed that transmission resources used in the LTE system include a frequency band with an overall bandwidth of 5 MHz 205, the frequency band is divided into 25 sub-channels with a size of 180 KHz 210, and each sub-channel is temporally divided in units of TTIs with a size of 1 msec 215. Accordingly, transmission resources of the LTE system can be represented by dividing the overall frequency band into a plurality of sub-channels and dividing each sub-channel in units of TTIs. Each of the smallest rectangles illustrated in FIG. 2 corresponds to a minimum unit of transmission resources in the LTE system, and is called a "resource block (RB)".

Hereinafter, a description will be given of HARQ. The HARQ is a combination of a Forward Error Correction (FEC) scheme and an Automatic Repeat Request (ARQ) scheme, which are typical transmission error control technology used in packet data transmission systems.

Assuming that a UE has transmitted a packet to an ENB, the ENB attempts to perform error correction for an HARQ packet transmitted by the UE, and determines whether or not to request the UE to retransmit the HARQ packet by using a simple error detection code, such as a CRC (Cyclic Redundancy Check) code. More specifically, if there is no error in the received HARQ packet, the ENB transmits an HARQ ACK signal to the UE. However, if the received HARQ packet is erroneous, the ENB transmits an HARQ NACK signal to the UE. In response to this, the UE transmits a retransmitted HARQ packet corresponding to the HARQ NACK signal to the ENB, and transmits a new HARQ packet corresponding to the HARQ ACK signal to the ENB. Also, when any HARQ packet is erroneous, the ENB can increase a data reception rate by using soft combining of previously received packets and a retransmitted packet.

Reference will now be made to a scheme in which an ENB allocates transmission resources to UEs by using the HARQ scheme. If a UE is allocated one transmission resource (i.e., one RB) at any point of time, it uses the allocated transmission resource until packet transmission thereto is completed using the HARQ scheme. Also, once the packet transmission to the UE is completed, the ENB allocates the transmission resource to another UE.

When packet transmission is erroneous in a data communication system using the HARQ scheme, a data reception rate in a receiving UE theoretically increases with an increase in the number of times of HARQ packet retransmission. However, because a delay requirement is given according to the types of communication services, a maximum retransmission limit of HARQ packet data retransmission is limited based on the types of transmitted data according to communication services. The delay requirement refers to a maximum permission delay time allowable within a range in which it will not affect a communication service if there is a transmission delay during transmission/reception of one packet.

For example, for interactive gaming, a maximum permission transmission delay amounts to merely several tens of milliseconds because a user is inconvenienced by any delay in data transmission. Thus, a maximum retransmission limit of an HARQ packet is limited to a small number of times, for example, one time. Conversely, for an FTP (File Transfer Protocol) service, a maximum permission transmission delay may amount to several seconds because it will not affect the service if a transmission delay time lengthens. Consequently, for a communication service tolerable to a transmission delay, retransmission may be performed a large number of times, for example, retransmission may be performed up to 15 times.

In principle, an ENB must efficiently allocate limited transmission resources to corresponding UEs. Therefore, in a data communication system using the HARQ scheme, an ENB ideally allocates a transmission resource to a UE only when needed.

For example, a transmission resource needs to be used until an ENB completes receiving a packet transmitted by a UE, and when a UE cannot receive ACK from an ENB within a maximum retransmission limit due to transmission errors.

In the latter case, the ENB cannot know if the current number of times of retransmission reaches the maximum retransmission limit. That is, when a UE fails to receive ACK from an ENB, even beyond the maximum retransmission limit, there is a problem in that the ENB cannot allocate a transmission resource to another UE although the UE does not use the corresponding transmission resource. Also, the maximum retransmission limit of an HARQ packet varies according to the types of transmitted data, as mentioned above, but an ENB cannot know what type of data is included in an HARQ packet until it successfully receive the HARQ packet. Therefore, there is a need for a method that enables an ENB to know what type of data is included in an HARQ packet and to know a maximum retransmission limit that is applied to the HARQ packet. In summary, there is a need for a method for an ENB to know if a current packet received from a UE corresponds to a maximum retransmission limit and what is the type of the data packet.

FIG. 3 illustrates a call processing diagram for explaining a method of transmitting and receiving packet data between an ENB and a UE using the HARQ scheme in a conventional mobile communication system. If the ENB 305 grants any transmission resource to the UE 310 in step 315, the UE transmits a data packet through the transmission resource in step 320. For reference, a MAC PDU (Medium Access Control Packet Data Unit) is illustrated as an example of a data packet in FIG. 3. In step 325, the UE transmits a last transmission indicator (LTI) along with the data packet. Here, the LTI is an external control signal indicating whether or not the packet transmission corresponds to the last retransmission, and is set to "No".

In step 330, if the ENB receives the packet, and determines through a CRC operation that the packet is erroneous, it transmits a NACK signal to the UE. In step 335, the UE retransmits the packet, using the same transmission resource at a point of time 375, a given period of time (hereinafter referred to as "HARQ RTT") later than a point of time 365 when the packet is transmitted.

Assuming that a maximum retransmission limit of the packet is set to 2, in step 340, the UE sets the LTI to "No" again, and transmits it along with the packet. Then, the ENB successfully receives the packet, and can perform soft combining of the packet and previously received packets.

In step 345, if the ENB determines through a CRC operation that the packet retransmitted in step 335 is still erroneous, it transmits a NACK signal to the UE in step 345. In step 350, the UE retransmits the packet once again by using the same transmission resource at a point of time an HARQ RTT later than a point of time when the packet is retransmitted. The retransmission in step 350 is the second retransmission following the retransmission in step 335. Thus, in step 355, the UE sets the LTI to "Yes", and retransmits it along with the packet. On receiving the packet with the LTI set to "Yes", the ENB transmits ACK or NACK to the UE according to a CRC operation in step 360. Because the LTI is set to "Yes" in step 355, in step 380, the ENB recognizes that the transmission resource allocated to the UE is not used any more irrespective of a result of the CRC operation in step 360, and reallocates the transmission resource to another UE.

In the conventional solution illustrated in FIG. 3, there is a problem in that transmission resources cannot be efficiently used because a UE uses an additional transmission resource for transmitting a separate external control signal (i.e., LTI) to an ENB. As in generally known in the art, the transmission resource used for transmitting the external control signal is several times or several tens of times as large as a transmission resource used for transmitting a packet. Therefore, in order to efficiently use transmission resources, there is a need for a method for a UE to inform an ENB whether or not a maximum retransmission limit is reached, even without using a separate transmission resource.

SUMMARY OF THE INVENTION

Accordingly, the present invention has been designed to solve at least the above-mentioned problems occurring in the prior art, and provides a method and apparatus for transmitting and receiving packet data in a mobile communication system, which can indicate whether or not a maximum retransmission limit is reached, even without using a separate transmission resource.

Further, the present invention provides a method and apparatus for transmitting and receiving packet data in a mobile communication system, which can efficiently use transmission resources.

Further, the present invention provides a method and apparatus for transmitting and receiving packet data in a mobile communication system, which can flexibly allocate transmission resources according to the types of communication services.

In accordance with an aspect of the present invention, there is provided a method of transmitting data by a UE using an HARQ scheme in a mobile communication system. The method includes the steps of: receiving configuration information from an Enhanced Node B (ENB), the configuration information including a first Maximum Retransmission Limit (MRL) value to be applied to data that is transmitted over a persistent resource; and when data to be transmitted by the UE is quasi-real time data, transmitting a first data packet to the ENB by using the persistent resource and applying the first MRL value to the first data packet, which is configured from the quasi-real time data.

In accordance with another aspect of the present invention, there is provided a method of receiving data by an ENB using an HARQ scheme in a mobile communication system. The method includes the steps of: transmitting configuration information to a User Equipment (UE), the configuration information including a first Maximum Retransmission Limit (MRL) value to be applied to data that is transmitted over a persistent resource; and when a quasi-real time data packet is received from the UE, applying the first MRL value to the quasi-real time data packet.

In accordance with another aspect of the present invention, there is provided a method of transmitting packet data by a UE using an HARQ scheme in a mobile communication system. The method includes the steps of: receiving connection setup information from an Enhanced Node B (ENB), the connection setup information including a first Maximum Retransmission Limit (MRL) value to be applied to quasi-real time data; when data to be transmitted is the quasi-real time data, transmitting a resource request to the ENB, the resource request including information indicating that the UE transmits the quasi-real time data; receiving a transmission resource that is allocated from the ENB in response to the resource request; and transmitting the quasi-real time data to the ENB by using the allocated transmission resource and applying the first MRL value the quasi-real time data.

In accordance with another aspect of the present invention, there is provided a method of receiving packet data by an ENB using an HARQ scheme in a mobile communication system. The method includes the steps of: transmitting connection setup information to a User Equipment (UE), the connection setup information including a first Maximum Retransmission Limit (MRL) value to be applied to quasi-real time data; when a resource request is received from the UE, the resource request including information indicating that the UE transmits the quasi-real time data, allocating a transmission resource to the UE in response to the resource request; and receiving the quasi-real time data, which the UE transmits using the allocated transmission resource, by applying the first MRL value the quasi-real time data.

In accordance with another aspect of the present invention, there is provided an apparatus for transmitting data by a UE using an HARQ scheme in a mobile communication system. The apparatus includes: an HARQ processor for performing a HARQ operation; a transceiver for receiving a packet subjected to the HARQ operation from the HARQ processor, transmitting the packet to an ENB, and receiving configuration information from the ENB, the configuration information including Acknowledgement/Negative Acknowledgement (ACK/NACK) information for the transmitted packet and a first Maximum Retransmission Limit (MRL) value to be applied to data that is transmitted over a persistent resource; and a controller for controlling the HARQ processor to apply the first MRL value to quasi-real time data and controlling the quasi-real time data to use the persistent resource when data to be transmitted by the UE is the quasi-real time data.

In accordance with another aspect of the present invention, there is provided an apparatus for receiving data by an ENB using an HARQ scheme in a mobile communication system. The apparatus includes: a transceiver for receiving packets transmitted by a User Equipment (UE), and transmitting configuration information to the UE, the configuration information including Acknowledgement/Negative Acknowledgement (ACK/NACK) information for the packets and a first Maximum Retransmission Limit (MRL) value to be applied to data that is transmitted over a persistent resource; an HARQ processor for receiving the packets from the transceiver, and performing a HARQ operation; and a controller for controlling the HARQ processor to apply the first MRL value to quasi-real time data packet, when the quasi-real time data packet is received from the UE over the persistent resource.

In accordance with another aspect of the present invention, there is provided an apparatus for transmitting packet data by a UE using an HARQ scheme in a mobile communication system. The apparatus includes: an HARQ processor for performing a given HARQ operation; a transceiver for receiving a packet subjected to the HARQ operation from the HARQ processor, transmitting the packet to an Enhanced Node B (ENB), receiving connection setup information from the ENB, the connection setup information including Acknowledgement/Negative Acknowledgement (ACK/NACK) information for the transmitted packet and a first Maximum Retransmission Limit (MRL) value to be applied to quasi-real time data, and transferring the connection setup information to a controller; a resource request transmitter for transmitting a resource request to the ENB through the transceiver under the control of the controller when data to be transmitted is the quasi-real time data, the resource request including information indicating that the UE transmits the quasi-real time data; a control channel processor for receiving transmission resource allocation information from the ENB through the transceiver in response to the resource request; and the controller for receiving the transmission resource allocation information from the control channel processor, and controlling the HARQ processor to apply the first MRL value to the quasi-real time data.

In accordance with another aspect of the present invention, there is provided an apparatus for receiving packet data by an ENB using an HARQ scheme in a mobile communication system. The apparatus includes: an HARQ processor for performing a given HARQ operation; a transceiver for receiving a packet transmitted by a User Equipment (UE), and transmitting connection setup information to the UE under the control of a controller, the connection setup information including Acknowledgement/Negative Acknowledgement (ACK/NACK) information for the packet and a first Maximum Retransmission Limit (MRL) value to be applied to quasi-real time data; a resource request receiver for receiving a resource request from the UE, the resource request including information indicating that the UE transmits the quasi-real time data, and transferring the resource request to the controller; and the controller for transmitting allocation information for a transmission resource, which is to be allocated to the UE, to the UE through the transceiver in response to the resource request, and controlling the HARQ processor to apply the first MRL value to the quasi-real time data when receiving the quasi-real time data that the UE transmits using the allocated transmission resource.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF THE EXEMPLARY EMBODIMENT

Figure 1:
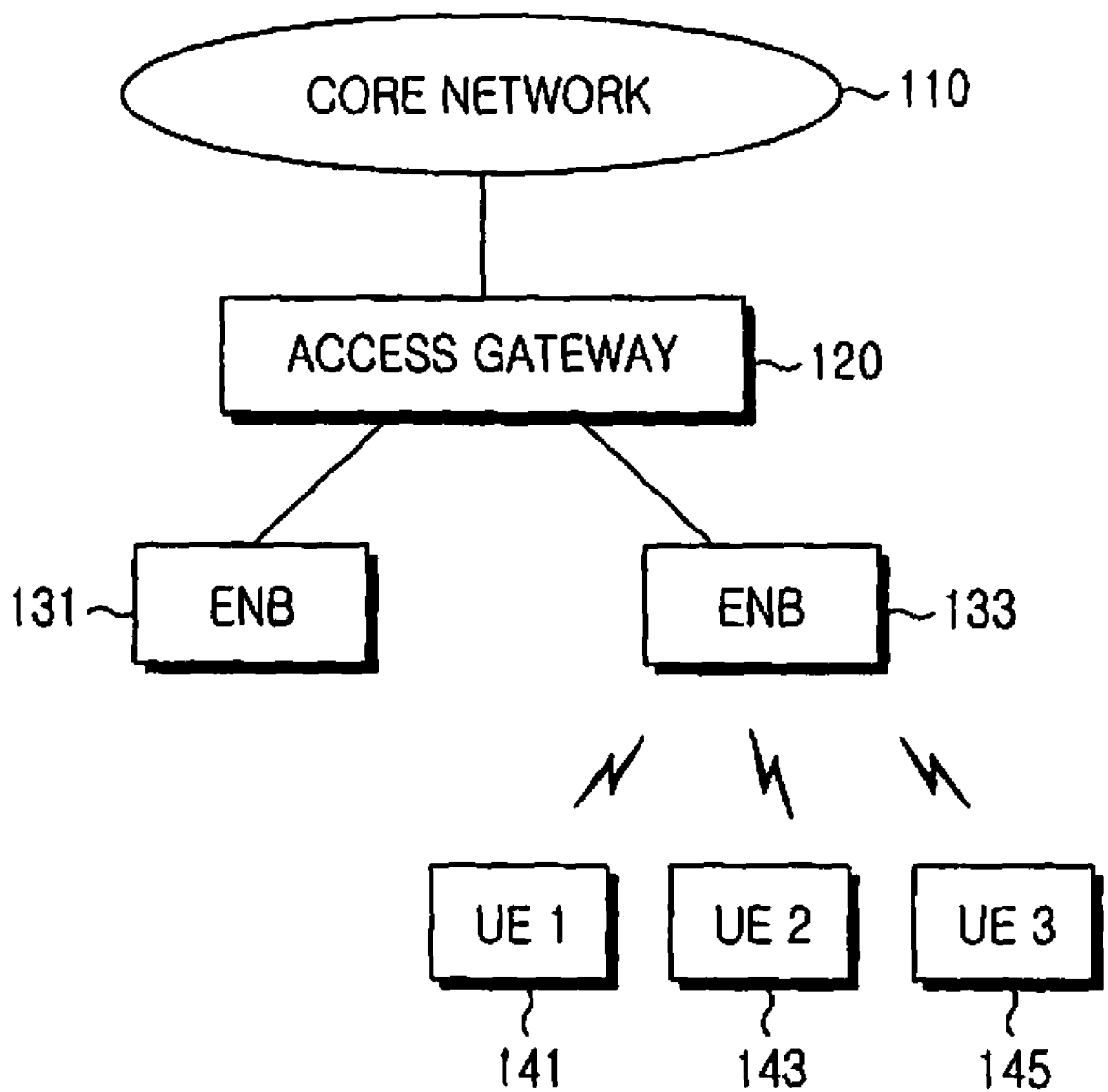
FIG. 1 is a block diagram illustrating a communication network structure of a conventional LTE system.
Figure 2:
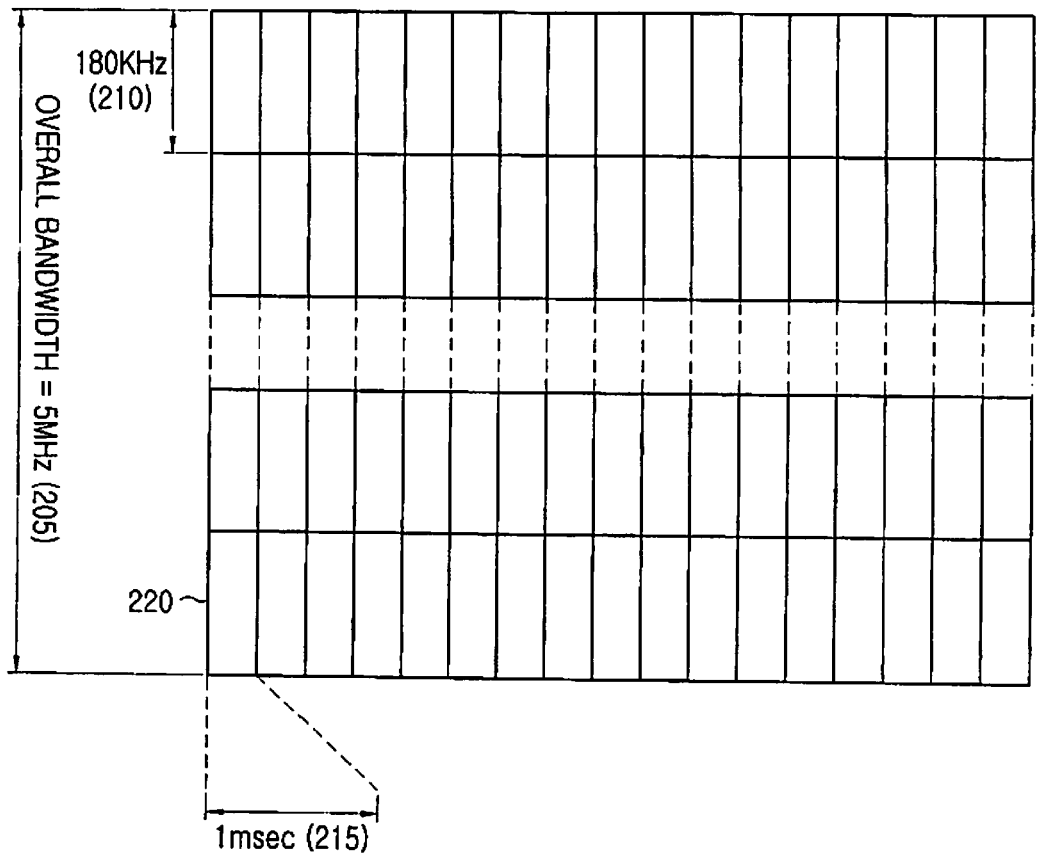
FIG. 2 is a conceptual view for explaining an RB in an LTE system.
Figure 3:
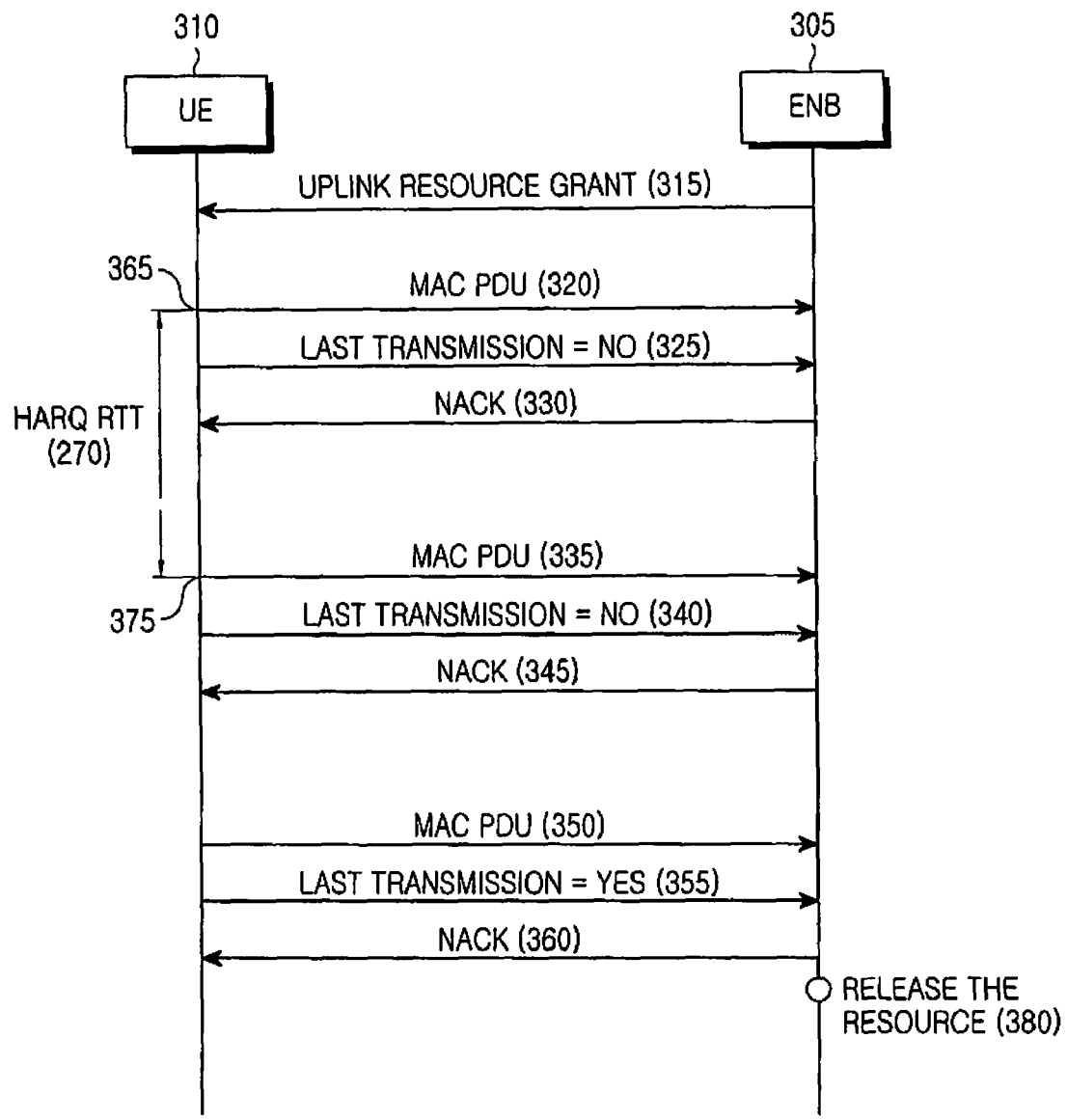
FIG. 3 is a call processing diagram for explaining a method of transmitting and receiving packet data between an ENB and a UE using an HARQ scheme in a conventional mobile communication system.

Hereinafter, exemplary embodiments of the present invention will be described with reference to the accompanying drawings. In the following description, the same elements will be designated by the same reference numerals although they are shown in different drawings. Further, various specific definitions found in the following description, such as specific values of packet identifications, contents of displayed information, etc., are provided only to help general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

The present invention includes two exemplary embodiments. First, a method according to a first exemplary embodiment of the present invention will be described. In the method according to the first embodiment of present invention, a receiving party can determine if a maximum retransmission limit of a packet is reached without the aid of a separate external control signal by fixing the maximum retransmission limit of a packet, which is transmitted over a specific transmission resource, to a predetermined value.

As described above, a maximum retransmission limit of data is closely connected with a Maximum Permission Delay (MPD). For example, assuming that the MPD of any data is 50(x)msec, a sum of all transmission delays for the data, except a delay occurring in a wireless channel, is 30(y)msec, an MPD during a HARQ retransmission time of the data is 50−30=20(x−y)msec. Here, "y" may be a sum of transmission delays occurring between an ENB and a gateway, between the gateway and an access network where the counterpart UE is located, and between the counterpart access network and the counterpart UE. Based on the above example, a relation between an MPD and an MRL, which is permitted in the course of HARQ data retransmission, can be summarized by Equation (1):

$$\text{HARQ MPD} = \text{TTI} + (\text{MRL} - 1) \times \text{HARQ RTT} \quad (1)$$

When a TTI of 1 msec and an HARQ RTT of 5 msec are assumed for communication services under consideration, an MRL according to the communication services can be predicted by Equation (1), and the predicted MRL according to the communication services is presented below in Table.

TABLE 1

| service type | service | HARQ MPD | MRL |
| --- | --- | --- | --- |
| quasi-real time service | interactive gaming | 10 msec | 1 |
| | VoIP | 40 msec | 7 |
| non-real time service | VOD | several sec | infinity |
| | FTP | several sec | infinity |
| | web browsing | several sec | infinity |

In Table 1, the services may be divided into services with an HARQ MPD (hereinafter briefly referred to as "MPD") of several seconds and services with an MPD of several milliseconds. For convenience of explanation, terms to be used in the following description will be defined first.

A service that has a shorter MPD and thus is intolerable to a transmission delay is defined as a "quasi-real time service" because a user can be satisfied with the quality of the service only when the service is provided to the user in real time or in a short time corresponding thereto. In contrast to this, a service that has an MPD of several seconds and thus is tolerable to a transmission delay is defined as a "non-real time service" because it is not important that the service is not provided in real time. The length of an MPD, by which the quasi-real time service and the non-real time service are divided, may vary according to given criteria.

For the quasi-real time service, because an MRL adapted to the characteristic of each service is predetermined, data has only to be transmitted by applying the predetermined MRL. However, for the non-real time service, a given MRL is applied to and used for each service in the same manner because infinitely repeated HARQ retransmission is not actually preferable in terms of the efficiency of transmission resources. It is preferred that the MRL of a non-real time service can be set to a sufficiently large value (e.g., 15).

In addition, a transmission resource used for the quasi-real time service and the non-real time service may be divided into a persistent resource and a dynamic resource according to whether or not it is temporarily used.

First, the dynamic resource will be discussed.

In a communication system in which an ENB manages transmission resources in real time, a UE reports its buffer state to the ENB in order to inform the ENB of the characteristic of data to be transmitted by itself and information about the amount of data. In response to this, the ENB allocates a transmission resource to the UE by synthetically considering buffer state reports from a plurality of UEs and channel situations of the respective UEs. Accordingly, the UE is allocated the transmission resource through layer-1 and layer-2 control messages after reporting its buffer state to the ENB, and such a transmission resource is called a "dynamic resource". This dynamic resource is a transmission resource that a UE uses until one packet is completely transmitted. The dynamic resource is used for transmitting/receiving data of most non-real time services.

However, for the quasi-real time service, which is intolerable to a transmission delay, a transmission delay due to the time required for a buffer state report may have a bad effect on the quality of the service. Consequently, an ENB allocate a certain transmission resource to a UE in advance without receiving the buffer state report from the UE, thereby enabling the UE to rapidly transmit data of the quasi-real time service. That is, a transmission resource that an ENB previously allocates to a UE without receiving a buffer state report and that the UE can semi-permanently use is called a "persistent resource". Here, the term "semi-permanent" means that the transmission resource is continuously used so long as a link between the UE and the ENB is established. The persistent resource is used for transmitting and receiving data of a quasi-real time service. that is, an ENB may semi-permanently allocate a part of all RBs in a transmission band to a specific UE. An allocation pattern of a persistent resource may also be defined according to the characteristic of a communication service provided to the UE. A concrete example of the allocation pattern definition will be described below with reference to FIG. 4.

Based on the above description, terms to be used herein will be defined.

An MRL that is applied to a packet to be transmitted over a dynamic resource is defined as MRL_DR (Maximum Retransmission Limit for Dynamic Resources).

An MRL that is applied to a packet to be transmitted over a persistent resource is defined as MRL_PR (Maximum Retransmission Limit for Persistent Resources). When a plurality of persistent resources are allocated, persistent resource #X is designated by MRL_PR_X for identification of the persistent resources. For example, persistent resource #1 is designated by MRL_PR_1.

Figure 4:
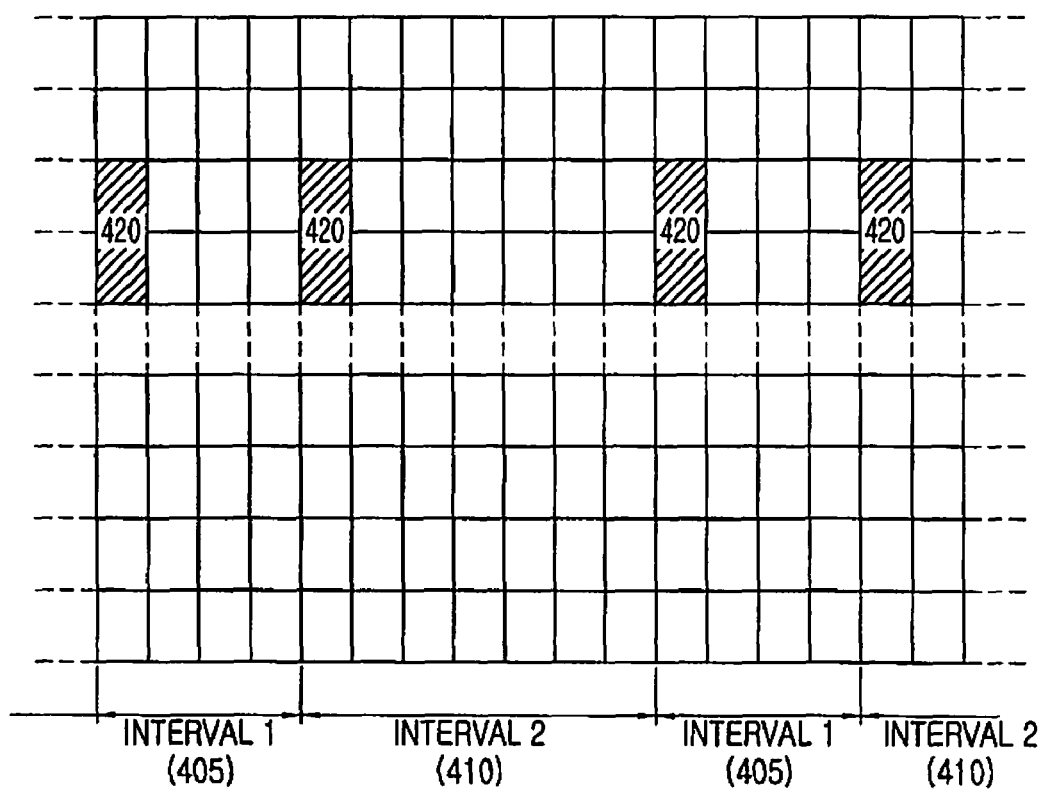
FIG. 4 is an illustrative view of an allocation pattern of a persistent resource in a mobile communication system in accordance with an embodiment of the present invention.

FIG. 4 illustrates a pattern of allocating a persistent resource in a mobile communication system according to an embodiment of the present invention. In FIG. 4, RBs constituting sub-channels allocated as a persistent resource to any UE are allocated to the corresponding UE according to a certain interval. More specifically, in FIG. 4, RBs constituting sub-channel #3 and sub-channel #4 are repeatedly allocated to the corresponding UE in an interval of T1 (=4 TTI) 405 and an interval of T2 (=7 TTI) 410, respectively. It is advantageous for a persistent resource to be cyclically allocated in this way, in that resources can be efficiently used according to the amount of data.

For reference, pattern information of persistent resource allocation may be transferred to a UE through a layer-3 control message, such as an RRC message. Also, information about which transmission resource is allocated as a persistent resource from among transmission resources under the control of an ENB may be given to a UE through layer-1 and layer-2 control messages. The layer-3 control message is exchanged through an RRC layer responsible for radio transmission resource control, and can be generally transmitted and received with sufficient reliability by an ARQ protocol of layer 2. The layer-1 and layer-2 control messages are transmitted to a UE through a given forward control channel, and are mostly used for forward and reverse transmission resource allocations.

Hereinafter, a description will be given of an example of setting an MRL according to the type of a resource allocated to a UE, and transmitting and receiving data accordingly. For a UE that is provided with an interactive gaming service, a VoIP service, and a web browsing service, it is assumed that an ENB allocates persistent resource #1 to the interactive gaming service, allocates persistent resource #2 to the VoIP service, sets the MRL of the persistent resource #1 to 1, and sets the MRL of the persistent resource #2 to 3. That is, MRL_PR_1=1 and MRL_PR_2=3 are assumed. Accordingly, the ENB sets the persistent resources in such a manner that interactive gaming data is preferentially transmitted to the UE over the persistent resource #1, and VoIP data is preferentially transmitted to the UE over the persistent resource #2. Subsequently, the UE does not determine an MRL according to the type of each data to be transmitted over a persistent resource, but transmits/receive data by applying the set MRL_PR_1=1 and MRL_PR_2=3. Also, on recognizing that a persistent resource is used for a received packet, the ENB applies the set MRL_PR_1=1 and MRL_PR_2=3 to the received packet.

Figure 5:
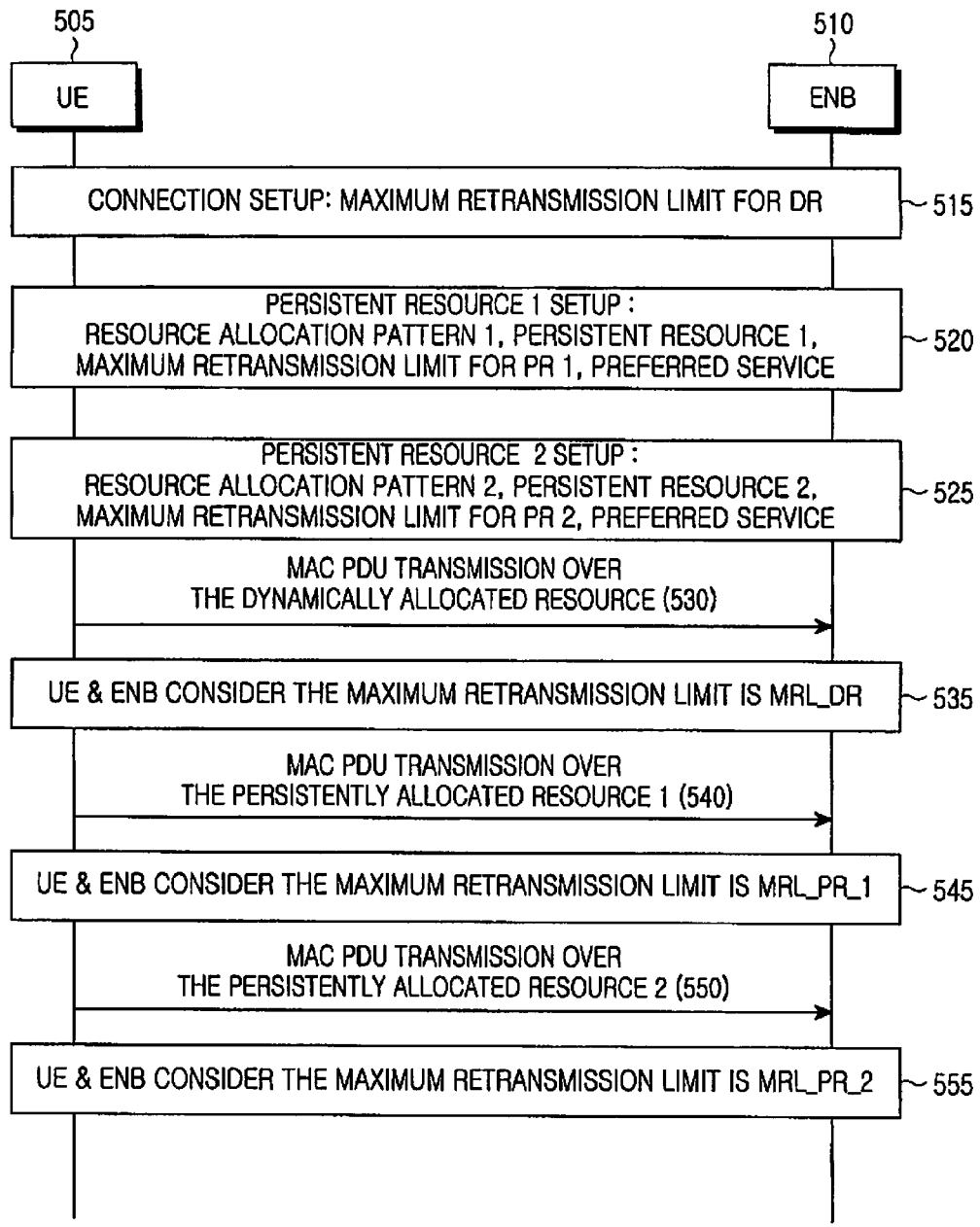
FIG. 5 is a flowchart illustrating a method of transmitting and receiving packet data between an ENB and a UE using an HARQ scheme in a mobile communication system in accordance with a first embodiment of the present invention.

FIG. 5 illustrates a method of transmitting and receiving packet data between an ENB and a UE using an HARQ scheme in a mobile communication system according to a first embodiment of the present invention. In step 515, a connection between the UE 505 and the ENB 510 is set up. That is, through the connection setup, the ENB 510 transmits MRL_DR information for dynamic resources to the UE 505. Here, the ENB 510 is merely an example of any apparatus managing radio resources. Thus, the ENB 510 may be substituted by and interpreted as any apparatus managing radio resources, e.g., as a scheduler.

For reference, the connection between the UE 505 and the ENB 510 is set up as follows: layer-1 and layer-2 apparatuses necessary for data transmission and reception are set up between the ENB 510 and the UE 505, and a network allocates an identifier for use in scheduling of the UE 505 to the UE 505. Accordingly, everything needed for data transmission and reception between the UE 505 and the network is ready. As well known to those skilled in the art, the layer-1 and layer-2 apparatuses may be implemented by hardware or software, but the layer-1 apparatus is generally implemented by hardware, and the layer-2 apparatus is generally implemented by software.

In step 520, assuming that the UE 505 is provided with a service corresponding to a quasi-real time service, in order to perform a setup for persistent resource #1 to be allocated to the UE 505, the ENB 510 transmits configuration information of the persistent resource #1 to the UE 505. The configuration information includes resource allocation pattern information defined for the persistent resource #1, RB information corresponding to the persistent resource #1, information about MRL_PR_1, information about a preferred service to be transmitted over the persistent resource #1, etc. If a resource allocation pattern is the same as that illustrated in FIG. 4, the resource allocation pattern information may be, for example, an RB allocation cycle. The RB information indicates which RB corresponds to persistent resource #n, and may be delivered through layer-1 and layer-2 control messages.

The information about a preferred service is transmitted to the UE 505 because data of a corresponding specific service is preferentially transmitted over a persistent resource. However, when there is no data of a specific service or the amount of data is insufficient, the persistent resource allocated to the UE 505 is preferably used for transmitting data of another service so as to prevent the persistent resource from being wasted. Therefore, the ENB 510 informs the UE 505 of a service (preferred service) to be preferentially transmitted over a persistent resource allocated to the UE 505. The UE 505 first transmits data of the preferred service over the persistent resource. However, if the amount of data of the preferred service is insufficient, data of another service may be transmitted over the persistent resource.

In step 525, assuming that the UE 505 is provided with another type of service corresponding to a quasi-real time service, the ENB 510 allocates persistent resource #2 to the UE 505 in the same manner as in step 520, and transmits configuration information for the persistent resource #2 to the UE 505.

In step 530, assuming that the UE 505 transmits data corresponding to a non-real time service, the UE 505 transmits a packet to the ENB 510 by using a dynamic resource allocated from the ENB 510. As illustrated in step 535, the UE 505 and the ENB 510 perform a packet retransmission operation by applying the MRL_DR information in step 515. In steps 530 and 535, the UE 505 and the ENB 510 operate as follows:

First, the UE 505 transmits a packet by using a dynamic resource, and receives NACK from the ENB 510. After a given HARQ RTT elapses, the UE 505 repeats an operation of retransmitting the packet by using the same dynamic resource until ACK is received from the ENB 510. If ACK is not received although the number of times of retransmission reaches the predetermined MRL_DR, the UE 505 determines that the dynamic resource is not allocated thereto any more, and abandons transmission of the packet.

Upon receiving a packet from the UE 505 over the dynamic resource, the ENB 510 determines through a CRC operation if the received packet is erroneous, and transmits NACK to the UE 505 when the received packet is erroneous. Also, the ENB 510 determines that the dynamic resource will be used by the UE 505 after a given HARQ RTT elapses, and thus does not allocate the dynamic resource to other UEs. The ENB 510 repeats this process until the packet is received without any error and soft combining of the received packet and previously received packets is achieved. If a non-erroneous packet is not received although the number of times of retransmission of the packet reaches the predetermined MRL_DR, the ENB 510 transmits NACK to the UE 505. Also, the ENB 510 determines that the dynamic resource is not used by the UE 505 any more, and allocates the dynamic resource to another UE 505.

In step 540, it is assumed that a data packet of a quasi-real time service is transmitted and received between the UE 505 and the ENB 510 over the persistent resource #1 in step 520. As illustrated in step 545, the UE 505 and the ENB 510 performs a packet retransmission operation by applying the MRL_PR_1, included in the configuration information in step 520, as the maximum retransmission limit of the packet. In steps 540 and 545, the UE 505 and the ENB 510 operate as follows:

The UE 505 repeats an operation of retransmitting the packet by using the persistent resource #1 until ACK is received from the ENB 510. If ACK is not received although number of times of retransmission reaches the predetermined MRL_PR_1, the UE 505 abandons transmission of the packet. Subsequently, the UE 505 transmits a new packet over the persistent resource #1.

Upon receiving a packet over the persistent resource #1, the ENB 510 determines through a CRC operation if the received packet is erroneous, and transmits NACK to the UE 505 when the received packet is erroneous. Also, the ENB 510 determines that the UE 505 will retransmit the packet over the persistent resource #1. The ENB 510 repeats this process until the packet is received without any error and soft combining of the received packet and previously received packets is achieved. If a non-erroneous packet is not received although the number of times of retransmission of the packet reaches the predetermined MRL_PR_1, the ENB 510 transmits NACK to the UE 505. Subsequently, the ENB 510 determines that a new packet will be received over the persistent resource, and empties a soft buffer in which the unsuccessfully received packet is stored.

In step 550, it is assumed that a data packet of a quasi-real time service is transmitted and received between the UE 505 and the ENB 510 over the persistent resource #2 in step 525. As illustrated in step 555, the UE 505 and the ENB 510 perform a packet retransmission operation by applying the MRL_PR_2, included in the configuration information in step 525, as the maximum retransmission limit of the packet. In steps 550, the UE 505 and the ENB 510 operate in the same manner as described in step 540, so a detailed description thereof will be omitted.

Through the procedure as illustrated in FIG. 5, a transmission resource is allocated according to the characteristic of a communication service, and a maximum retransmission limit according to the characteristic of the service is predetermined, so that a UE 505 and an ENB 510 can know if a maximum retransmission limit of a packet is reached, even without using a separate external control signal. Hereinafter, operations of a UE 505 and an ENB 510 according to the embodiment illustrated in FIG. 5 will be described with reference to FIGS. 6 and 7.

Figure 6:
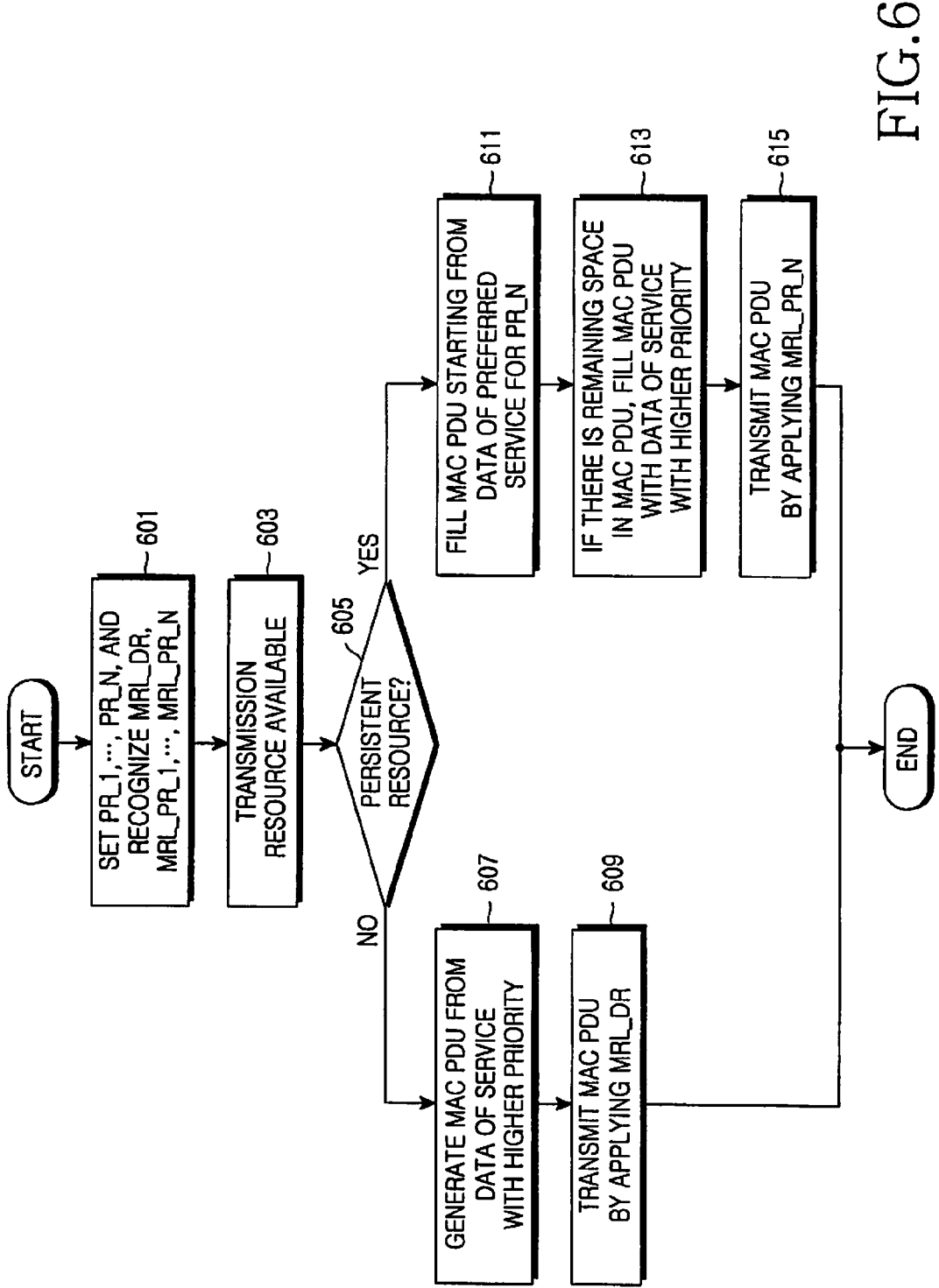
FIG. 6 is a flowchart illustrating a UE operation in accordance with the first embodiment of the present invention.

FIG. 6 illustrates a UE operation according to the first embodiment of the present invention. In step 601, the UE receives MRL_DR information corresponding to a maximum retransmission limit to be applied to each packet to which a dynamic resource is allocated, and configuration information for each of any N persistent resources from an ENB. The configuration information is the same as that described in step 520 of FIG. 5. That is, for persistent resource #n, the configuration information includes allocation pattern information defined for the persistent resource #n, RB information corresponding to the persistent resource #n, information about MRL_PR_n, information about a preferred service to be transmitted over the persistent resource #n, etc. Upon receiving the configuration information, the UE can recognize which persistent resource is allocated thereto. Thus, the UE transmits a packet of a quasi-real time service over the persistent resource, and transmits a packet of a non-real time service by requesting the ENB to allocate a dynamic resource thereto and by using the allocated dynamic resource.

If a transmission resource available to the UE occurs in step 603, the UE determines in step 605 if the transmission resource is a persistent resource. If the transmission resource is not a persistent resource, that is, if the transmission resource is a dynamic resource, in step 607, the UE calculates the size of a non-real time service packet that can be transmitted using the dynamic resource, and generates a packet from data belonging to a service with higher priority. In step 609, the UE applies the MRL_DR received in step 601 to the configured non-real time service packet, and transmits the non-real time service packet by using the dynamic resource.

However, if the transmission resource is a persistent resource, in step 611, the UE calculates the size of a quasi-real time service packet that can be transmitted using the persistent resource, and determines what is a preferred service to be preferentially transmitted over the persistent resource. The UE first fills a packet with data of the preferred service. If there is a remaining space in the quasi-real time packet even after the quasi-real time packet is generated from the data of the preferred service, in step 613, the UE fills the packet with data of services other than the quasi-real time service. The other services may be set according to given criteria, and may be quasi-real time service data or non-real time service data. In step 615, the UE transmits the packets generated in steps 611 and 613. Here, a maximum retransmission limit to be applied to the packets is the MRL_PR_n received in step 601.

Figure 7:
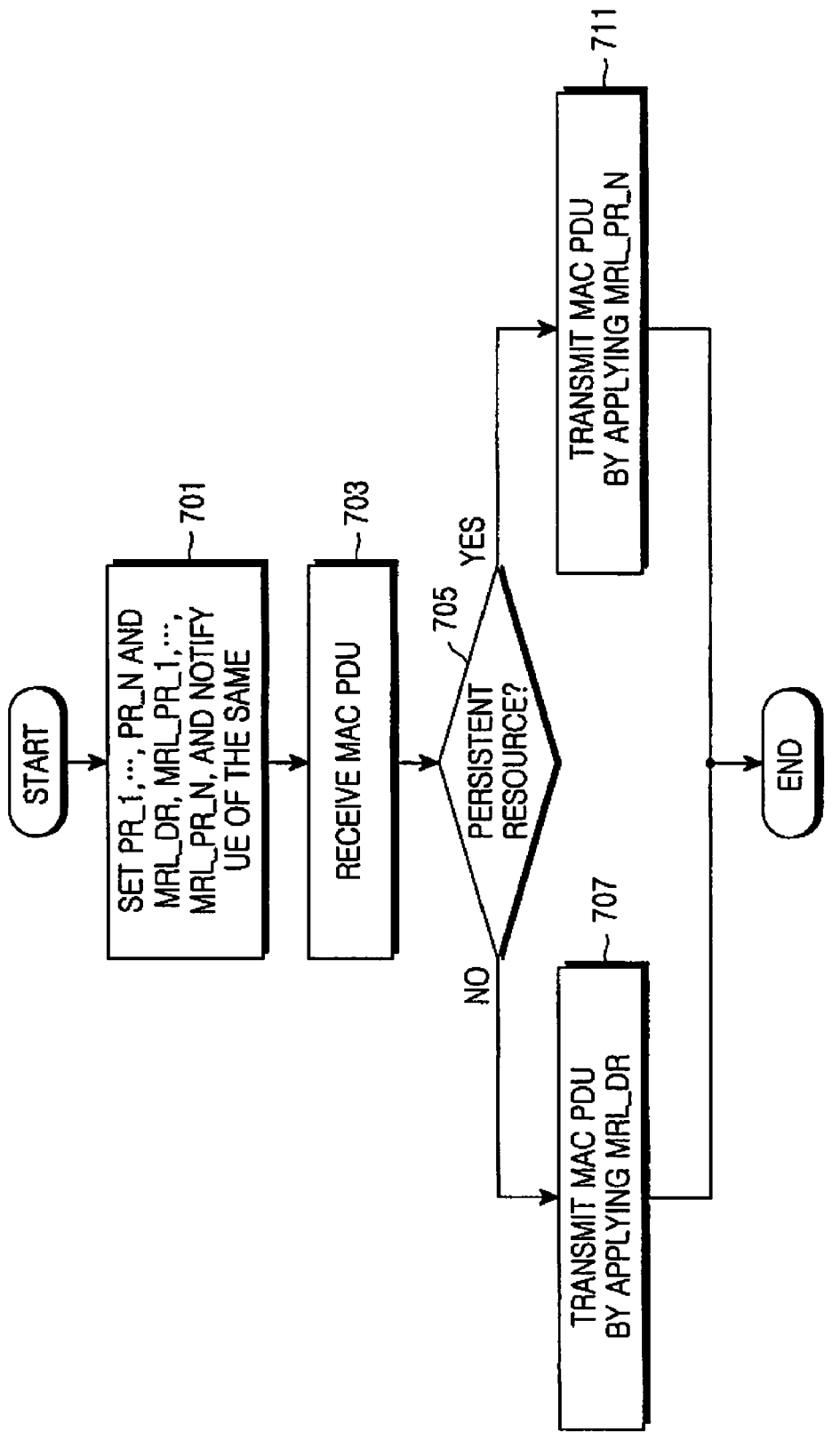
FIG. 7 is a flowchart illustrating an ENB operation in accordance with the first embodiment of the present invention.

FIG. 7 illustrates an ENB operation according to the first embodiment of the present invention. In step 701, the ENB sets MRL_DR information for dynamic resources and configuration information for N persistent resources, and transmits them to a UE. Here, a maximum retransmission limit for persistent resource #n (MRL_PR_n) is determined by considering a preferred service for the persistent resource, a transmission delay, etc. Upon receiving any packet from the UE in step 703, the ENB proceeds to step 705, and determines if a resource used for transmission of the received packet is a persistent resource. If the resource is not a persistent resource, in step 707, the ENB applies the MRL_DR to the received packet. That is, if the ENB does not transmit ACK to the UE until the number of times of reception of a retransmitted packet reaches the MRL_DR, it determines that the UE will not use the dynamic resource used for transmission of the packet, and allocates the dynamic resource to another UE.

However, if the resource is a persistent resource, in step 709, the ENB applies the MRL_PR_n to the received packet. That is, if the ENB does not transmit ACK to the UE until the number of times of reception of the packet reaches the MRL_PR_n, it considers reception of the packet to be unsuccessful, and discards the packet stored in a soft buffer.

Above, the method according to the first embodiment of the present invention has been described. Hereinafter, a description will be given of a method according to a second embodiment of the present invention. In the method according to the second embodiment of the present invention, a maximum retransmission limit (MRL) is determined based on which service a UE requests resource allocation for in the process where an ENB performs scheduling in response to the resource allocation request.

Figure 8:
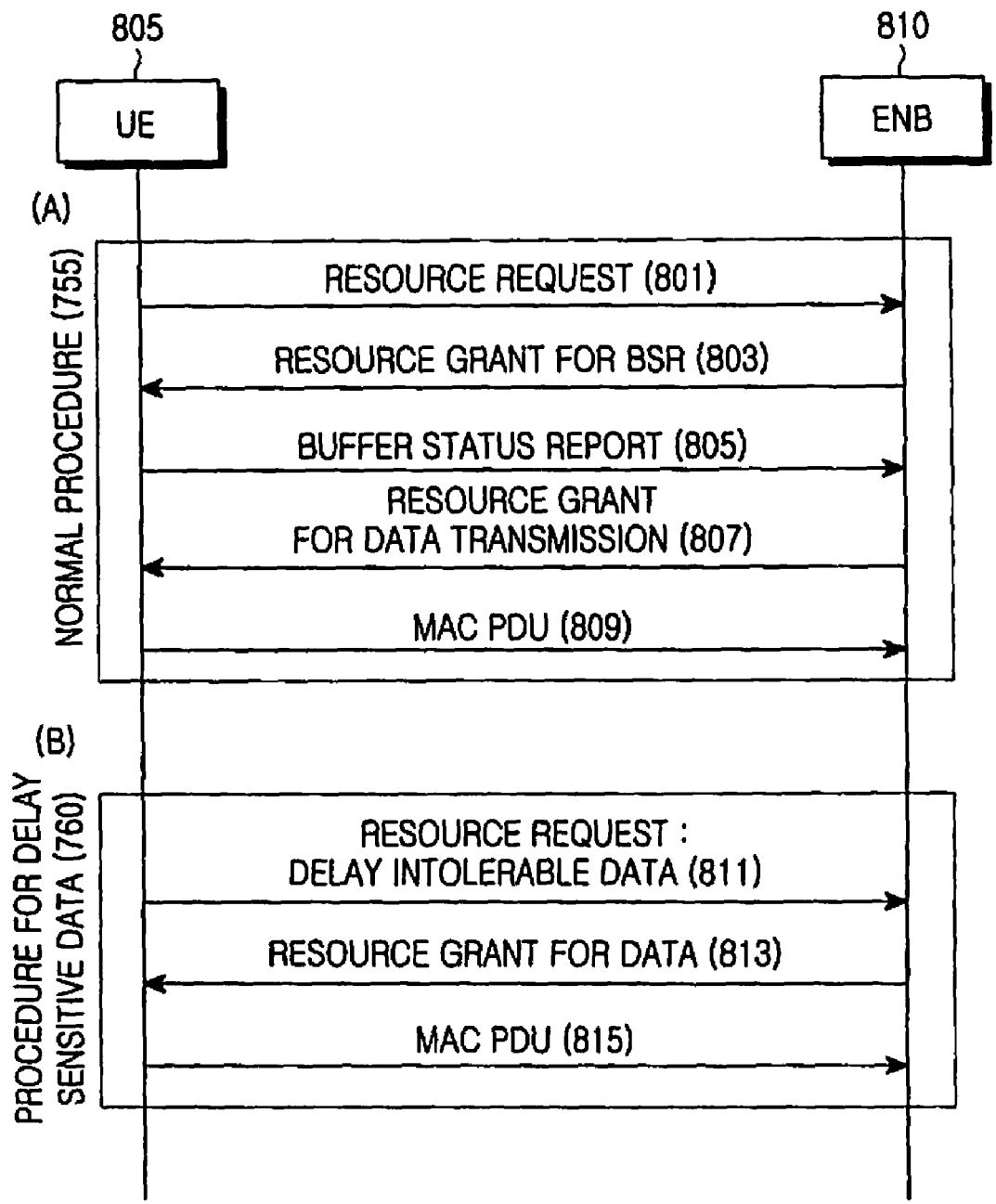
FIG. 8 is a call processing diagram for explaining a concept of transmitting and receiving packet data between an ENB and a UE using an HARQ scheme in a mobile communication system in accordance with a second embodiment of the present invention.

FIG. 8 illustrates a concept of transmitting and receiving packet data between an ENB and a UE using an HARQ scheme in a mobile communication system according to the second embodiment of the present invention. The UE is previously allocated a transmission resource, which is used for requesting the ENB to allocate a transmission resource thereto, from the ENB at regular intervals. For reference, the resource for requesting resource allocation may be set in such a manner that it is used only for one UE or is used in common for a plurality of UEs. Also, because the size of the resource for requesting resource allocation cannot exceed a certain limit, the amount of information transmitted over the resource for requesting resource allocation is also very limitative. Therefore, the UE usually transmits information, which indicates whether or not there is data to be transmitted, to the ENB over the allocated resource for requesting resource allocation. For the convenience of explanation, the information indicating whether or not there is data to be transmitted is referred to as a "resource request" in the following description.

Referring to FIG. 8, in step 801 of FIG. 8a, the UE 805 transmits resource request information to the ENB 810. In step 803, the ENB allocates a given first transmission resource to the UE 805 in response to the resource request from the UE 805. The amount of the first transmission resource is typically small. In step 805, the UE 805 transmits a "buffer state report" message to the ENB 810 over the first transmission resource. The buffer state report message includes information about the amount and characteristic of data to be transmitted by the UE 805. In step 807, the ENB 810 allocates a second transmission resource to the UE 805 by making reference to the buffer state report so as to allow the UE 805 to transmit data. In step 809, the UE transmits data to the ENB over the second transmission resource. In the normal procedure 755 illustrated in FIG. 8, the overall transmission delay increases because a transmission delay occurs in the process of transmitting the buffer state report message. However, because non-real time service data is insensitive to a transmission delay, a transmission resource can be allocated corresponding to the amount and characteristic of data to be transmitted by the UE 805, even when a transmission delay slightly lengthens, and thus it is possible to efficiently use transmission resources. Nevertheless, the normal procedure 755 of FIG. 8 may cause a problem for a quasi-real time service data. Thus, in some cases, a procedure for delay sensitive data 760, as will be briefly described in FIG. 8, may be applied to transmission of quasi-real time service data.

FIG. 8 illustrates a procedure for delay sensitive data 760, i.e., for transmitting quasi-real time service data, to the ENB 810. In step 811, the UE 805 transmits a resource request to the ENB 810, and additionally informs the ENB 810 that data to be transmitted corresponds to a quasi-real time service, by using a given notification scheme. An example of the given notification scheme is a scheme in which 2-bit resource request information is used, and one of code points is used for informing the ENB 810 of quasi-real time service data. In step 813, the ENB 810 recognizes that the UE 805 will transmit quasi-real time service data, and immediately allocates a transmission resource for actual data transmission to the UE 805. In step 815, the UE 805 transmits the data by using the allocated transmission resource.

The procedure for delay sensitive data 760, as described in FIG. 8, omits the allocation of the first transmission resource for the buffer state report in step 803 and the buffer state report in step 805. Because the transmission resource allocated in step 813 is not intended to transmit the buffer state report message, it is generally larger than the first transmission resource in step 803. Thus, the ENB 810 may allocate a large transmission resource without information about the amount and characteristic of data to be transmitted by the UE 805, and thus the allocated transmission resource may not be fully used. However, for quasi-real time service data, the quality of a communication service can be improved by reducing a transmission delay time. Accordingly, if quasi-real time service data and non-real time service data are transmitted through different resource request procedures, the quality of a communication service can be improved. Hereinafter, in view of the concept described in FIG. 8, a method according to the second embodiment of the present invention will be described with reference to FIG. 9.

Figure 9:
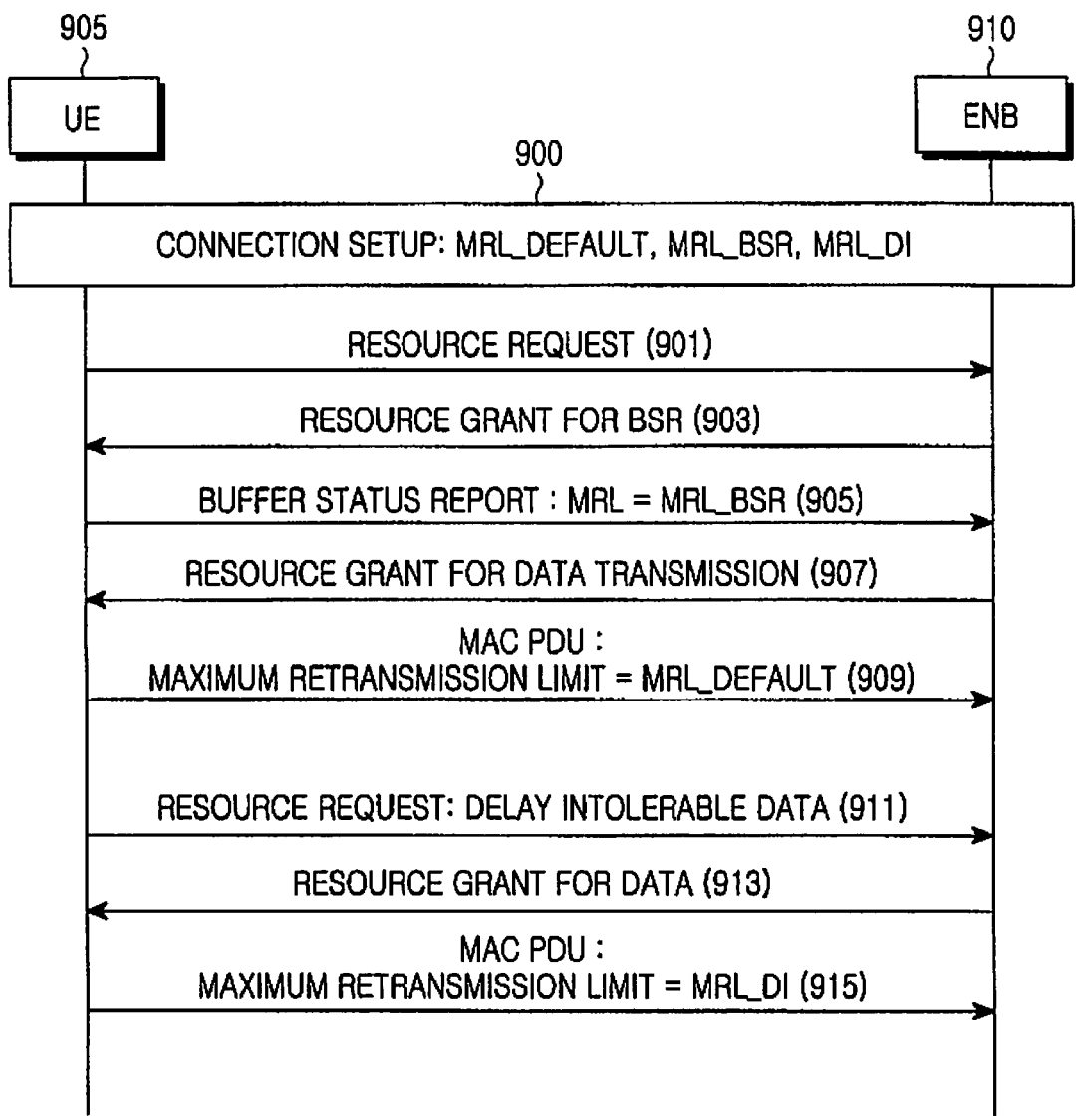
FIG. 9 is a call processing diagram for explaining a method of transmitting and receiving packet data between an ENB and a UE using an HARQ scheme in a mobile communication system in accordance with the second embodiment of the present invention.

FIG. 9 illustrates a method of transmitting and receiving packet data between an ENB 910 and a UE 905 using an HARQ scheme in a mobile communication system according to the second embodiment of the present invention. In step 900, a connection between the ENB 910 and the UE 905 is set up. In this connection setup step, the ENB 910 transmits a maximum retransmission limit (MRL) according to the type of data to be transmitted by the UE 905. That is, the ENB 910 transmits information, including setting values of three maximum retransmission limits, that is, MRL_Default, MRL_BSR (Buffer State Report), and MRL_DI (Delay_Intolerable), to the UE 905. Also, the UE 905 may transmit a resource request to the ENB 910 over a resource for requesting resource allocation.

The MRL_Default is an MRL to be applied to a packet that the UE 905 transmits using a transmission resource allocated through a normal resource request procedure. The MRS_BSR an MRL to be applied to a packet that is transmitted using a transmission resource allocated for transmission of a buffer state report message by the ENB 910. The MRL_DI is an MRL to be applied to a packet that the UE 905 transmits using a transmission resource allocated through a resource request procedure for quasi-real time service data. The MRL_Default and the MRL_BSR may have a value common to all UEs, and the MRL_DI may have a different value according to the type of a service provided to each UE.

In step 901, the UE 905 transmits a resource request to the ENB 910 in order to transmit non-real time service data. Subsequent steps 903 to 909 are the same as steps 803 to 809 of FIG. 8, so a detailed description thereof will be omitted. However, the MRL_BSR set in step 900 is used as a maximum retransmission limit to be applied to a buffer state report message packet that is transmitted by the UE 905 in step 905. Also, the MRL_Default is used as a maximum retransmission limit to be applied to a non-real time service data packet in step 909.

In step 911, it is assumed that the UE 905 transmits a resource request to the ENB 901 in order to transmit quasi-real time service data. Steps 911 to 915 are the same as steps 811 to 815 of FIG. 8, so a detailed description thereof will be omitted. However, the MRL_DI set in step 900 is used as a maximum retransmission limit to be applied to a quasi-real time service packet in step 915.

In FIG. 9, the MRL_BSR is applied to a packet that is transmitted over a first transmission resource first allocated from the ENB 910 after the UE 905 transmits a typical resource request to the ENB 910. The MRL_DI is applied to a packet that is transmitted over a transmission resource first allocated from the ENB 910 after the UE 905 transmits a resource request including information indicating that it transmits quasi-real time service data. The MRL_Default is applied to other types of packets.

Figure 10:
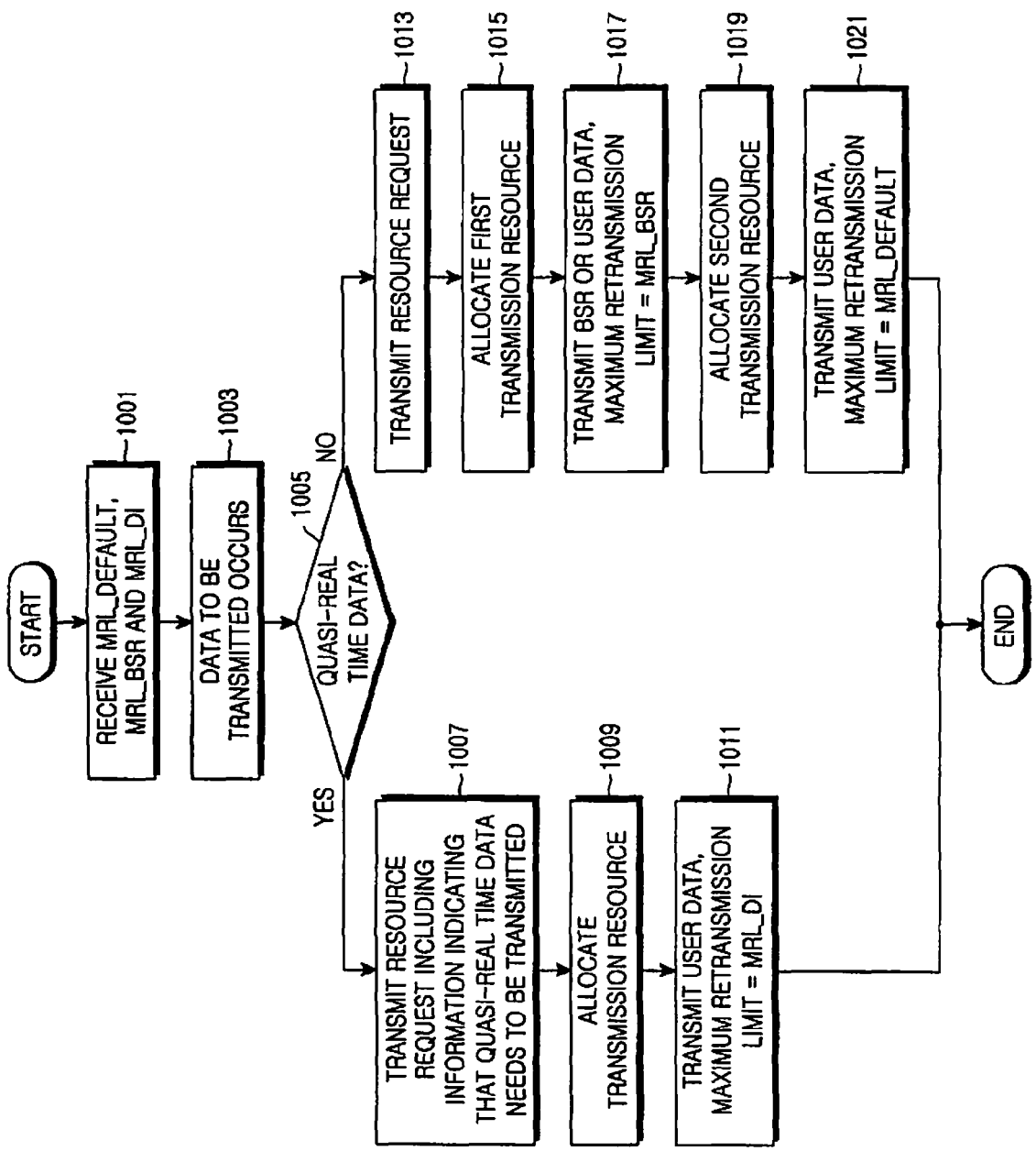
FIG. 10 is a flowchart illustrating a UE operation in accordance with the second embodiment of the present invention.

FIG. 10 illustrates a UE operation according to the second embodiment of the present invention. In step 1001, the UE receives information about MRL_Default, MRL_BSR, and MRL_DI from an ENB. If data to be transmitted to the ENB occurs in step 1003, when there is no transmission resource allocated to the UE, in step 1005, the UE determines the type of data to be transmitted. If the type of data is quasi-real time service data, in step 1007, the UE transmits a resource request, which includes information indicating that it is necessary to transmit quasi-real time service data, to the ENB. In step 1009, the ENB allocates a transmission resource to the UE in response to the resource request. In step 1011, the UE transmits a quasi-real time service data packet to the ENB over the allocated transmission resource. Here, the MRL_DI is applied as a maximum retransmission limit for the packet.

However, if the type of data is non-real time service data, in step 1013, the UE transmits a typical resource request to the ENB. In step 1015, the ENB allocates a first transmission resource to the UE in response to the resource request. In step 1017, the UE transmits a packet by using the first transmission resource. In general, the packet transmitted over the first transmission resource is a buffer state report message. However, if the amount of user data is small enough to be transmitted within the capacity of the first transmission resource, the packet may be a non-real time service data packet. Here, the MRL_BSR set in step 1001 is applied as a maximum retransmission limit for a packet that is transmitted over the first transmission resource.

If all the non-real time service data packets are not transmitted over the first transmission resource, in step 1019, the ENB allocates a second transmission resource to the UE according to the buffer state report. In step 1021, the UE transmits the remaining non-real time service data packets over the second transmission resource. Here, the MRL_Default set in step 1001 is applied to a maximum retransmission limit for the non-real time service data packets.

Figure 11:
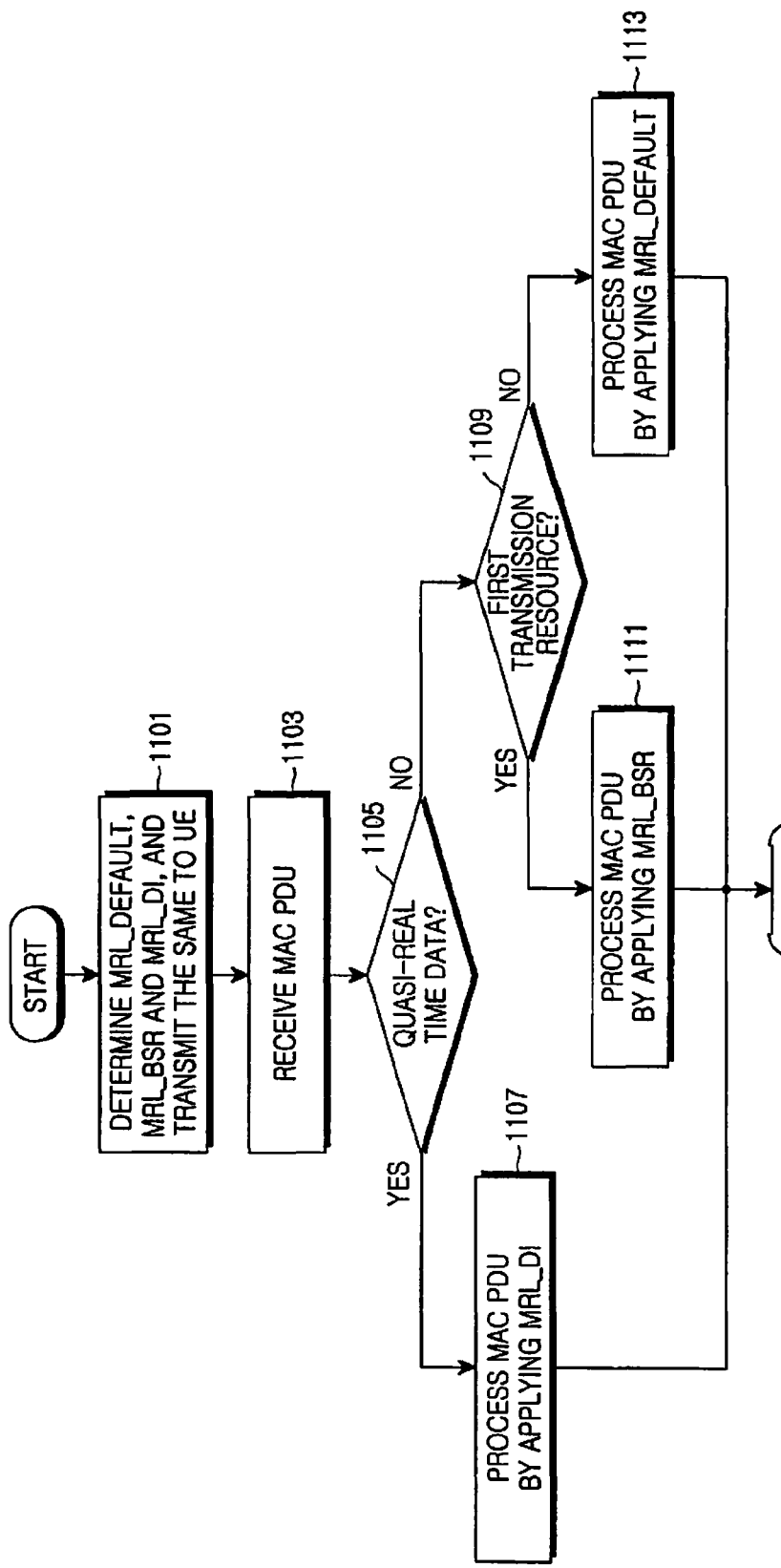
FIG. 11 is a flowchart illustrating an ENB operation in accordance with the second embodiment of the present invention.

FIG. 11 illustrates an ENB operation according to the second embodiment of the present invention. In step 1101, the ENB determines MRL_Default, MRL_BSR, and MRL_DI, and transmits them to a UE. Upon receiving a packet from the UE in step 1103, in step 1105, the ENB checks if a transmission resource allocated to the received packet is allocated according to a resource allocation procedure for a quasi-real time service packet. If the transmission resource is allocated according to the resource allocation procedure for a quasi-real time service packet, in step 1107, the ENB processes the quasi-real time service packet by applying the MRL_DI set in step 1101 thereto. However, if the transmission resource is not allocated according to the resource allocation procedure for a quasi-real time service packet, in step 1109, the ENB checks if the received packet is transmitted over a first transmission resource allocated at the request of the UE. If the received packet is transmitted over the first transmission resource according to the resource request from the UE, in step 1111, the ENB applies the MRL_BSR as a maximum retransmission limit for the received packet. However, if the received packet is not transmitted over the first transmission resource, in step 1113, the ENB processes the received packet by applying the MRL_Default thereto.

Figure 12:
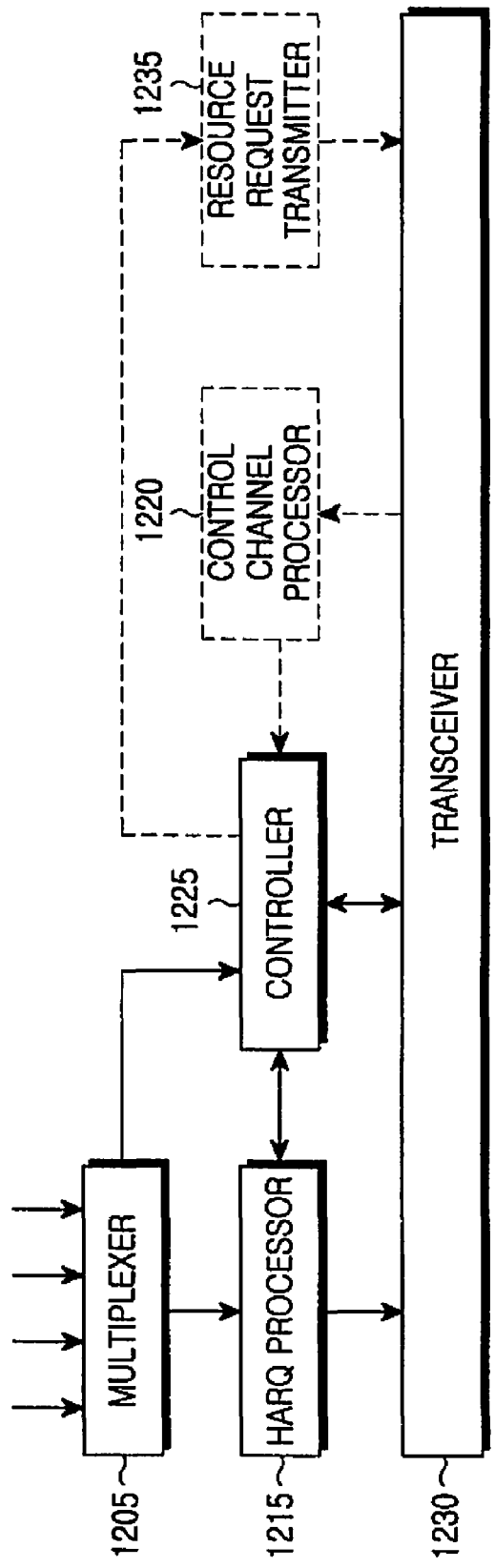
FIG. 12 is a block diagram illustrating a structure of a UE in accordance with the first and second embodiments of the present invention.

FIG. 12 illustrates a structure of a UE according to the first and second embodiments of the present invention. A multiplexer 1205 multiplexes upper layer packets into one packet, and transfers the multiplexed packet to an HARQ processor 1215. The HARQ processor 1215 performs a given HARQ operation to configure a packet, and transfers the configured packet to a transceiver 1230. Also, the HARQ processor 1215 performs buffering for retransmission of the packet.

The transceiver 1230 transmits a packet, received from the HARQ processor 1215, to an ENB, and receives Acknowledgement/Negative Acknowledgement (ACK/NACK) information for the transmitted packet from the ENB. Also, the transceiver 1230 receives control information over a forward control channel or transmits a resource request to the ENB.

When the above-described operation according to the first embodiment is performed, a controller 1225 determines which transmission resource is used for transmitting a packet stored in the HARQ processor 1215. Also, the controller 1225 sets a maximum retransmission limit for the corresponding packet, and releases a transmission resource allocated to the packet when ACK is not received from the ENB until the number of times of packet retransmission reaches the corresponding maximum retransmission limit. If the transmission resource allocated to the packet is a persistent resource, the controller 1225 controls the persistent resource to transmit a new packet there through.

More specifically, the controller 1225 controls the multiplexer 1205 to configure a quasi-real time service packet from quasi-real time service data when data to be transmitted is the quasi-real time service data, and controls the HARQ processor 1215 to apply MRL_DI to the quasi-real time service packet. If data to be transmitted by the UE is non-real time service data, the controller 1225 controls the multiplexer 1205 to configure a non-real time service packet from the non-real time service data, and controls the HARQ processor 1215 to apply MRL_DR to the non-real time service packet.

When the UE performs the operation according to the second embodiment, it may additionally include a control channel processor 1220 and a resource request (RR) transmitter 1235. The control channel processor 1220 receives transmission resource allocation information transmitted by the ENB, and forwards it to the controller 1225. The RR transmitter 1235 transmits a resource request to the ENB thought the transceiver 1230 under the control of the controller 1225.

The controller 1225 controls the RR transmitter 1235 to transmit a resource request to the ENB according to the type of data to be transmitted. More specifically, when the UE is to transmit quasi-real time service data, the controller 1225 controls the RR transmitter 1235 to transmit a resource request including information indicating that the quasi-real time service data is transmitted, as described in step 811 of FIG. 8. Also, the controller 1225 receives transmission resource allocation information from the control channel processor 1220, and based thereon, determines a maximum retransmission limit to be applied according to the type of a packet that is transmitted over the allocated transmission resource.

More specifically, when data to be transmitted by the UE is quasi-real time service data, the controller 1225 controls the RR transmitter 1235 to transmit a resource request including information indicating transmission of the quasi-real time service data. Subsequently, the controller 1225 receives resource allocation information, allocated in response to the resource request, from the control channel processor 1220. Also, the controller 1225 controls the multiplexer 1205 to configure a quasi-real time service packet from the quasi-real time service data, and controls the HARQ processor 1215 to apply MRL_DI to the quasi-real time service packet.

When data to be transmitted by the UE is non-real time service data, the controller 1225 controls the RR transmitter 1235 to transmit a resource request for transmission of buffer state report data to the ENB, and controls the multiplexer 1205 to configure a buffer state report data packet from the buffer state report data. Upon receiving a first transmission resource allocated from the ENB in response to the resource request, the controller 1225 controls the HARQ processor 1215 to apply MRL_BSR to the buffer state report data packet. Further, when a second transmission resource is allocated from the ENB according to the buffer state report data packet, the controller 1225 controls the multiplexer to configure a non-real time service from non-real time service data, and controls the HARQ processor 1215 to apply MRL_Default to the non-real time service packet.

Figure 13:
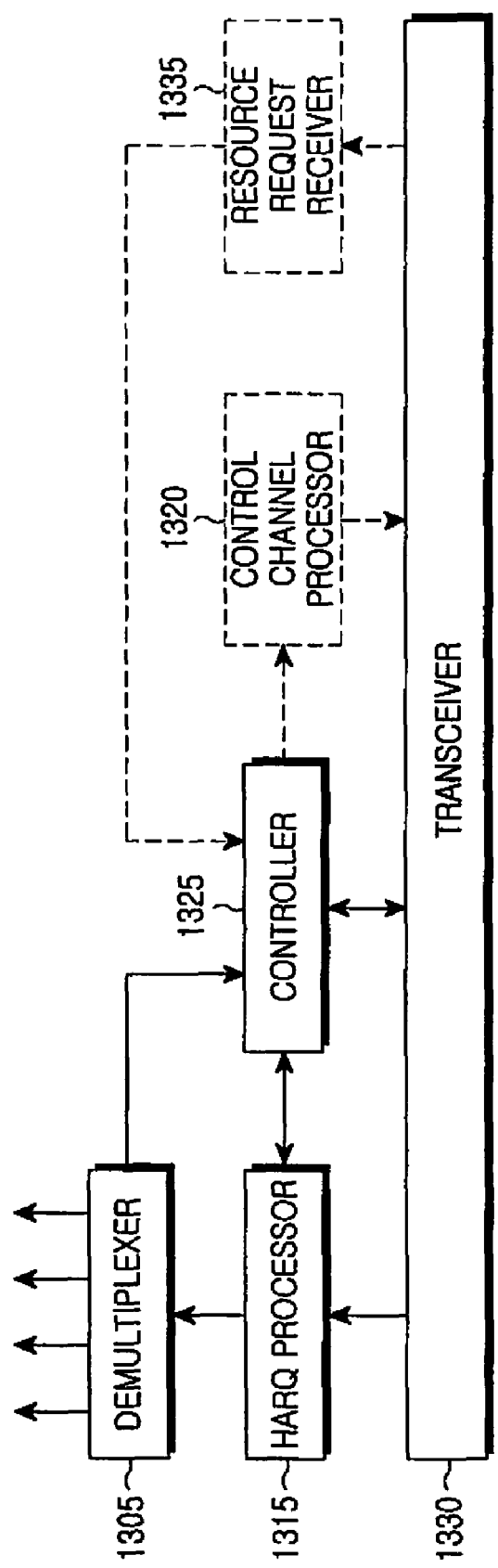
FIG. 13 is a block diagram illustrating a structure of an ENB in accordance with the first and second embodiments of the present invention.

FIG. 13 illustrates a structure of an ENB according to the first and second embodiments of the present invention. In FIGS. 12 and 13, constituent elements added for the second embodiment are represented by dotted lines. A transceiver 1330 receives a packet transmitted by a UE, and transmits ACK/NACK information to the UE. Also, the transceiver 1330 transmits transmission resource allocation information over a forward control channel, and receives a resource request from the UE. An HARQ processor 1315 receives packets from the transceiver 1330, and stores them in a soft buffer through a given HARQ operation, performs soft combining of the stored packets and a packet received through a retransmission process, and then forwards the soft-combined packet to a demultiplexer 1305. Further, the transceiver 1330 determines if a received packet is erroneous, generates ACK/NACK information based on the determination, and then forwards the ACK/NACK information to a controller 1325.

When the operation according to the first embodiment is performed, the controller 1325 controls the HARQ processor 1315 according to a maximum retransmission limit set for a packet received in the transceiver 1330, and determines whether or not to release a transmission resource.

More specifically, when the ENB receives a quasi-real time service packet, the controller 1325 controls the demultiplexer 1305 to configure quasi-real time service data from the quasi-real time service packet, and controls the HARQ processor 1315 to apply MRL_PR_n to the quasi-real time service packet. When the ENB receives a non-real time service packet, the controller 1325 controls the demultiplexer 1305 to configure non-real time data from the non-real time service packet, and controls the HARQ processor 1315 to apply MRL_DR to the non-real time service packet.

When the operation according to the second embodiment is performed, the ENB additionally includes a control channel transmitter 1320 and an RR receiver 1335. The control channel transmitter 1320 forwards a transmission resource allocation message indicating transmission resource information, which is to be allocated to the UE, to the transceiver 1330, and transmits it to the UE over a given channel. The RR receiver 1335 receives a resource request transmitted by the UE through the transceiver 1330, and forwards it to the controller 1325. The controller 1325 allocates a resource to the UE in response to the resource request forwarded from the RR receiver 1335. That is, the controller 1325 allocates a resource to the UE according to whether the resource request is a resource request for quasi-real time service data or non-real time service data.

If the resource request is a resource request for quasi-real time service data, the controller 1325 allocates a transmission resource with a size greater than a given reference value in order to enable the UE to immediately transmit the data, and applies MRL_DI as a maximum retransmission limit for a packet to be received over the allocated transmission resource. If the resource request is a resource request for non-real time service data, the controller 1325 allocates a transmission resource with a size less than a given reference value corresponding to transmission of a buffer state report message, and applies MRL_BSR as a maximum retransmission limit for a packet to be received over the transmission resource.

More specifically, when the ENB receives a resource request, which includes information indicating that quasi-real time service data is transmitted, from the UE, the controller 1325 allocates a transmission resource to the UE. When the ENB receives a quasi-real time service packet, the controller 1325 controls the demultiplexer 1305 to configure the quasi-real time service data from the quasi-real time service packet, and controls the HARQ processor 1315 to apply MRL_DI to the quasi-real time service packet.

Further, when the ENB receives a resource request for buffer state report data, the ENB allocates a first transmission resource to the UE. If the ENB receives a buffer state report data packet over the first transmission resource, the controller 1325 controls the HARQ processor 1315 to apply MRL_BSR to the buffer state report data packet.

When the ENB allocates a second transmission resource to the UE in response to the buffer state report data packet, and receives non-real time service packet, configured from non-real time service data, over the second transmission resource, the controller 1325 controls the demultiplexer 1305 to configure the non-real time service data from the non-real time service packet, and controls the HARQ processor 1315 to apply MRL_Default to the non-real time service packet.

As described above, according to the present invention, whether or not a maximum retransmission limit is reached can be detected without using a separate transmission resource in a mobile communication system. Consequently, communication resources can be efficiently used for transmitting and receiving packet data. Further, because transmission resources can be flexibly allocated according to the types of communication services, user satisfaction for the quality of a communication service can be improved.

While the present invention has been shown and described with reference to certain exemplary embodiments thereof, it will be understood by those skilled in the art that various changes in form and details may be made therein without departing from the spirit and scope of the present invention as defined by the appended claims.

What is claimed is:

1. A method of transmitting data by a User Equipment (UE) using a Hybrid Auto Repeat Request (HARQ) scheme in a mobile communication system, the method comprising the steps of:
    receiving configuration information from an Enhanced Node B (ENB), the configuration information including a first Maximum Retransmission Limit (MRL) value to be applied to data that is transmitted over a persistent resource; and
    when data to be transmitted by the UE is quasi-real time data, transmitting a first data packet to the ENB by using the persistent resource and applying the first MRL value to the first data packet, which is configured from the quasi-real time data.

2. The method of claim 1, wherein receiving the configuration information comprises receiving a second MRL value to be applied to data that is transmitted over a dynamic resource.

3. The method of claim 2, further comprising the steps of:
    when the data to be transmitted by the UE is non-real time data, requesting the ENB to allocate the dynamic resource;
    receiving the dynamic resource allocated from the ENB; and
    transmitting a second data packet to the ENB by using the allocated dynamic resource and applying the second MRL value the second data packet, which is configured from the non-real time data.

4. The method of claim 1, wherein receiving the configuration information comprises receiving preferred service information defining priorities of data to be transmitted over the persistent resource.

5. The method of claim 4, further comprising the step of:
    if there is a remaining space in the first data packet, after the first data packet is configured from the quasi-real time data, sequentially filling the first data packet with data having a priority that is determined according to the preferred service information.

6. A method of receiving data by an Enhanced Node B (ENB) using a Hybrid Auto Repeat Request (HARQ) scheme in a mobile communication system, the method comprising the steps of:
    transmitting configuration information to a User Equipment (UE), the configuration information including a first Maximum Retransmission Limit (MRL) value to be applied to data that is transmitted over a persistent resource; and
    when a quasi-real time data packet is received from the UE, applying the first MRL value to the quasi-real time data packet.

7. The method of claim 6, wherein transmitting the configuration information comprises transmitting a second MRL value to be applied to data that is transmitted over a dynamic resource.

8. The method of claim 7, further comprising the steps of:
    receiving a request for allocating the dynamic resource from the UE;
    allocating the dynamic resource to the UE; and
    receiving a non-real time data packet, which the UE transmits using the allocated dynamic resource, by applying the second MRL value the non-real time data packet.

9. The method of claim 6, wherein transmitting the configuration information comprises transmitting preferred service information for defining priorities of data to be transmitted over the persistent resource.

10. The method of claim 9, further comprising the step of:
    if there is a remaining space in a first data packet after the first data packet is configured from quasi-real time data, sequentially filling the first data packet with data having a priority that is determined according to the preferred service information.

11. A method of transmitting packet data by a User Equipment (UE) using a Hybrid Auto Repeat Request (HARQ) scheme in a mobile communication system, the method comprising the steps of:
    receiving connection setup information from an Enhanced Node B (ENB), the connection setup information including a first Maximum Retransmission Limit (MRL) value to be applied to quasi-real time data;
    when data to be transmitted is the quasi-real time data, transmitting a resource request to the ENB, the resource request including information indicating that the UE transmits the quasi-real time data;
    receiving a transmission resource that is allocated from the ENB in response to the resource request; and
    transmitting the quasi-real time data to the ENB by using the allocated transmission resource and applying the first MRL value the quasi-real time data.

12. The method of claim 11, wherein receiving the connection setup information comprises receiving a second MRL value to be applied to buffer state report data of the UE.

13. The method of claim 12, further comprising the steps of:
    when the data to be transmitted by the UE is non-real time data, transmitting a first resource request for a buffer state report of the UE to the ENB;
    receiving a first transmission resource allocated from the ENB in response to the first resource request; and
    transmitting the buffer state report data to the ENB by using the first transmission resource and applying the second MRL value the buffer state report data.

14. The method of claim 13, wherein receiving the connection setup information comprises receiving a third MRL value to be applied to non-real time data.

15. The method of claim 14, further comprising the steps of:
    receiving a second transmission resource allocated from the ENB in response to the buffer state report data transmitted to the ENB; and
    transmitting the non-real time data to the ENB by using the allocated second transmission resource and applying the third MRL value to the non-real time data.

16. A method of receiving packet data by an Enhanced Node B (ENB) using a Hybrid Auto Repeat Request (HARQ) scheme in a mobile communication system, the method comprising the steps of:
    transmitting connection setup information to a User Equipment (UE), the connection setup information including a first Maximum Retransmission Limit (MRL) value to be applied to quasi-real time data;
    when a resource request is received from the UE, the resource request including information indicating that the UE transmits the quasi-real time data, allocating a transmission resource to the UE in response to the resource request; and
    receiving the quasi-real time data, which the UE transmits using the allocated transmission resource, by applying the first MRL value the quasi-real time data.

17. The method of claim 16, wherein transmitting the connection setup information comprises transmitting a second MRL value to be applied to buffer state report data of the UE.

18. The method of claim 17, further comprising the steps of:
when a first resource request for the buffer state report data is received from the UE, allocating a first transmission resource to the UE; and
receiving the buffer state report data, which the UE transmits using the allocated first transmission resource, by applying the second MRL value the buffer state report data.

19. The method of claim 18, wherein transmitting the connection setup information comprises transmitting a third MRL value to be applied to non-real time data.

20. The method of claim 19, further comprising the steps of:
allocating a second transmission resource to the UE in response to the buffer state report data received from the UE; and
receiving the non-real time data, which the UE transmits using the allocated second transmission resource, by applying the third MRL value to the non-real time data.

21. An apparatus for transmitting data by a User Equipment (UE) using a Hybrid Auto Repeat Request (HARQ) scheme in a mobile communication system, the apparatus comprising:
an HARQ processor for performing a HARQ operation;
a transceiver for receiving a packet subjected to the HARQ operation from the HARQ processor, transmitting the packet to an ENB, and receiving configuration information from the ENB, the configuration information including Acknowledgement/Negative Acknowledgement (ACK/NACK) information for the transmitted packet and a first Maximum Retransmission Limit (MRL) value to be applied to data that is transmitted over a persistent resource; and
a controller for controlling the HARQ processor to apply the first MRL value to quasi-real time data and controlling the quasi-real time data to use the persistent resource when data to be transmitted by the UE is the quasi-real time data.

22. The apparatus of claim 21, wherein the configuration comprises a second MRL value to be applied to data that is transmitted over a dynamic resource.

23. The apparatus of claim 22, wherein the controller transmits a request for allocating the dynamic resource to the ENB through the transceiver, when the data to be transmitted by the UE is a non-real time data packet, controls the non-real time data packet to use the dynamic resource allocated in response to the request, and controls the HARQ processor to apply the second MRL value to the non-real time data packet.

24. The apparatus of claim 21, wherein the configuration information comprises preferred service information for defining priorities of data to be transmitted over the persistent resource.

25. The apparatus of claim 24, wherein the controller controls a multiplexer of the UE to sequentially fill a first data packet with data having a priority that is determined according to the preferred service information if there is a remaining space in the first data packet, after the first data packet is configured from the quasi-real time data.

26. An apparatus for receiving data by an Enhanced Node B (ENB) using a Hybrid Auto Repeat Request (HARQ) scheme in a mobile communication system, the apparatus comprising:

a transceiver for receiving packets transmitted by a User Equipment (UE), and transmitting configuration information to the UE, the configuration information including Acknowledgement/Negative Acknowledgement (ACK/NACK) information for the packets and a first Maximum Retransmission Limit (MRL) value to be applied to data that is transmitted over a persistent resource;
an HARQ processor for receiving the packets from the transceiver, and performing a HARQ operation; and
a controller for controlling the HARQ processor to apply the first MRL value to quasi-real time data packet, when the quasi-real time data packet is received from the UE over the persistent resource.

27. The apparatus of claim 26, wherein the configuration information comprises a second MRL value to be applied to data that is transmitted over a dynamic resource.

28. The apparatus of claim 27, wherein the controller allocates the dynamic resource to the UE through the transceiver when the UE requests the NB to allocate the dynamic resource, and controls the HARQ processor to apply the second MRL value to non-real time data packet when the non-real time data packet is received through the transceiver, the non-real time data packet being transmitted by the UE using the allocated dynamic resource.

29. The apparatus of claim 26, wherein the configuration information comprises preferred service information for defining priorities of data to be transmitted over the persistent resource.

30. The apparatus of claim 29, wherein, if there is a remaining space in the quasi-real time data packet, after the quasi-real time data packet is configured from the quasi-real time data, the quasi-real time data packet is sequentially filled with data having a priority that is determined according to the preferred service information.

31. An apparatus for transmitting packet data by a User Equipment (UE) using a Hybrid Auto Repeat Request (HARQ) scheme in a mobile communication system, the apparatus comprising:
an HARQ processor for performing a given HARQ operation;
a transceiver for receiving a packet subjected to the HARQ operation from the HARQ processor, transmitting the packet to an Enhanced Node B (ENB), receiving connection setup information from the ENB, the connection setup information including Acknowledgement/Negative Acknowledgement (ACK/NACK) information for the transmitted packet and a first Maximum Retransmission Limit (MRL) value to be applied to quasi-real time data, and transferring the connection setup information to a controller;
a resource request transmitter for transmitting a resource request to the ENB through the transceiver under the control of the controller when data to be transmitted is the quasi-real time data, the resource request including information indicating that the UE transmits the quasi-real time data;
a control channel processor for receiving transmission resource allocation information from the ENB through the transceiver in response to the resource request; and
the controller for receiving the transmission resource allocation information from the control channel processor, and controlling the HARQ processor to apply the first MRL value to the quasi-real time data.

32. The apparatus of claim 31, wherein the connection setup information comprises a second MRL value to be applied to buffer state report data of the UE.

33. The apparatus of claim 32, wherein the resource request transmitter transmits a first resource request for buffer state report data of the UE to the ENB when the data to be transmitted by the UE is non-real time data, and wherein the controller controls the HARQ processor to apply the second MRL value to the buffer state report data and controls the buffer state report data to use a first transmission resource when receiving allocation information of the first transmission resource allocated from the ENB in response to the first resource request.

34. The apparatus of claim 33, wherein the connection setup information comprises a third MRL value to be applied to non-real time data.

35. The apparatus of claim 34, wherein the controller controls the HARQ processor to apply the third MRL value to the non-real time data, and controls the non-real time data to use a second transmission resource when receiving allocation information of the second transmission resource allocated from the ENB in response to the buffer state report data transmitted to the ENB.

36. An apparatus for receiving packet data by an Enhanced Node B (ENB) using a Hybrid Auto Repeat Request (HARQ) scheme in a mobile communication system, the apparatus comprising:

an HARQ processor for performing a given HARQ operation;

a transceiver for receiving a packet transmitted by a User Equipment (UE), and transmitting connection setup information to the UE under the control of a controller, the connection setup information including Acknowledgement/Negative Acknowledgement (ACK/NACK) information for the packet and a first Maximum Retransmission Limit (MRL) value to be applied to quasi-real time data;

a resource request receiver for receiving a resource request from the UE, the resource request including information indicating that the UE transmits the quasi-real time data, and transferring the resource request to the controller; and the controller for transmitting allocation information for a transmission resource, which is to be allocated to the UE, to the UE through the transceiver in response to the resource request, and controlling the HARQ processor to apply the first MRL value to the quasi-real time data when receiving the quasi-real time data that the UE transmits using the allocated transmission resource.

37. The apparatus of claim 36, wherein the connection setup information comprises a second MRL value to be applied to buffer state report data of the UE.

38. The apparatus of claim 37, wherein the controller allocates a first transmission resource to the UE when receiving a first resource request for buffer state report data from the UE through the transceiver, transmits allocation information of the first transmission resource to the UE through the transceiver, and controls the HARQ processor to apply the second MRL value to the buffer state report data when receiving the buffer state report data, which the UE transmits using the allocated first transmission resource, through the transceiver.

39. The apparatus of claim 38, wherein the connection setup information comprises a third MRL value to be applied to non-real time data.

40. The apparatus of claim 39, wherein the controller transmits allocation information of a second transmission resource, which is allocated to the UE in response to the buffer state report data received from the UE, to the UE through the transceiver, and controls the HARQ processor to apply the third MRL value to non-real time data when receiving the non-real time data through the transceiver, the non-real time data being transmitted by the UE using the allocated second transmission resource.

* * * * *